(12) United States Patent
Harris

(10) Patent No.: US 11,074,804 B2
(45) Date of Patent: *Jul. 27, 2021

(54) WEARABLE PERSONAL SECURITY DEVICES AND SYSTEMS

(71) Applicant: Marc Allan Harris, Chicago, IL (US)

(72) Inventor: Marc Allan Harris, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/079,246

(22) Filed: Oct. 23, 2020

(65) Prior Publication Data

US 2021/0056833 A1 Feb. 25, 2021

Related U.S. Application Data

(63) Continuation of application No. 16/091,059, filed as application No. PCT/US2017/026455 on Apr. 6, 2017, now Pat. No. 10,839,672.

(Continued)

(51) Int. Cl.
*G08B 25/01* (2006.01)
*H04N 5/247* (2006.01)
(Continued)

(52) U.S. Cl.
CPC ....... *G08B 25/016* (2013.01); *G08B 13/1966* (2013.01); *G08B 13/19613* (2013.01); *G08B 13/19656* (2013.01); *G08B 25/08* (2013.01); *H04N 5/2251* (2013.01); *H04N 5/2252* (2013.01); *H04N 5/2256* (2013.01);
(Continued)

(58) Field of Classification Search
USPC ........................................................ 348/158
See application file for complete search history.

(56) References Cited

U.S. PATENT DOCUMENTS 9,247,779 B1 2/2016 Aloumanis
9,460,596 B1 10/2016 Moses
(Continued)

FOREIGN PATENT DOCUMENTS

CA 2357697 A1 12/2002
EP 2860963 A1 4/2015
(Continued)

OTHER PUBLICATIONS

International Search Report in International Application No. PCT/US2017/026455, dated Jun. 19, 2017 (3 pages).
(Continued)

*Primary Examiner* — Rodney E Fuller
(74) *Attorney, Agent, or Firm* — Nixon Peabody LLP

(57) ABSTRACT

A security device includes a housing, a digital camera, an electronic storage medium, and a communication module. The digital camera is coupled to the housing and is configured to capture data. The electronic storage medium is coupled to the digital camera such that the electronic storage medium is configured to store the captured data therein. The communication module is configured to transmit the captured data according to an ordered sequence of data transmissions in response to the occurrence of a triggering event, the ordered sequence including (i) a first transmission of captured data including data captured prior to the triggering event, and (ii) a second transmission of captured data including data captured subsequent to the triggering event.

21 Claims, 15 Drawing Sheets

Related U.S. Application Data

(60) Provisional application No. 62/319,008, filed on Apr. 6, 2016, provisional application No. 62/442,153, filed on Jan. 4, 2017, provisional application No. 62/453,122, filed on Feb. 1, 2017.

(51) Int. Cl.
| | |
|---|---|
| *H04N 7/18* | (2006.01) |
| *H04N 5/232* | (2006.01) |
| *H04N 5/225* | (2006.01) |
| *G08B 13/196* | (2006.01) |
| *H04N 5/77* | (2006.01) |
| *G08B 25/08* | (2006.01) |

(52) U.S. Cl.
CPC .......... *H04N 5/2258* (2013.01); *H04N 5/232* (2013.01); *H04N 5/23206* (2013.01); *H04N 5/23218* (2018.08); *H04N 5/23238* (2013.01); *H04N 5/23245* (2013.01); *H04N 5/247* (2013.01); *H04N 5/77* (2013.01); *H04N 7/185* (2013.01)

(56) References Cited

U.S. PATENT DOCUMENTS

| | | | |
|---|---|---|---|
| 10,839,672 B2 * | 11/2020 | Harris | .............. G08B 13/19613 |
| 2004/0164896 A1 | 8/2004 | Evans | |
| 2005/0275714 A1 | 12/2005 | Ishikawa | |
| 2007/0191070 A1 | 8/2007 | Rao | |
| 2007/0297610 A1 | 12/2007 | Chen | |
| 2008/0180537 A1 | 7/2008 | Weinberg | |
| 2010/0020229 A1 * | 1/2010 | Hershey | ............... H04N 5/2252 348/376 |
| 2010/0151818 A1 | 6/2010 | Miller | |
| 2011/0283328 A1 | 11/2011 | Davis | |
| 2012/0050532 A1 | 3/2012 | Rhyins | |
| 2012/0242698 A1 | 9/2012 | Haddick | |
| 2012/0307050 A1 | 12/2012 | Mimar | |
| 2013/0188792 A1 | 7/2013 | Renkis | |
| 2014/0152777 A1 | 6/2014 | Galor | |
| 2015/0065082 A1 | 3/2015 | Sehgal | |
| 2015/0098687 A1 | 4/2015 | Sabripour | |
| 2015/0248772 A1 | 9/2015 | Gove | |
| 2016/0026867 A1 | 1/2016 | Wexler | |
| 2016/0027291 A1 | 1/2016 | Remer | |
| 2016/0028947 A1 | 1/2016 | Wexler | |
| 2016/0034764 A1 | 2/2016 | Connor | |
| 2016/0227173 A1 | 8/2016 | Yamaguchi | |
| 2017/0061200 A1 | 3/2017 | Wexler | |
| 2019/0273855 A1 * | 9/2019 | Wexler | .................. G06F 1/1686 |

FOREIGN PATENT DOCUMENTS

| | | |
|---|---|---|
| EP | 2983357 A2 | 10/2016 |
| WO | WO 2015/164224 | 10/2015 |

OTHER PUBLICATIONS

European Extended Search Report in European Patent Application No. EP 17779868.3, dated Oct. 22, 2019 (2 pages).

* cited by examiner

WEARABLE PERSONAL SECURITY DEVICES AND SYSTEMS

CROSS-REFERENCE TO RELATED APPLICATIONS

This application is a continuation of U.S. patent application Ser. No. 16/091,059, filed on Oct. 3, 2018, now allowed, which is a U.S. National Stage of International Application No. PCT/US2017/026455, filed Apr. 6, 2017, which claims the benefit of and priority to U.S. Provisional Application No. 62/319,008, filed on Apr. 6, 2016, 62/442,153, filed on Jan. 4, 2017, and 62/453,122, filed on Feb. 1, 2017, each of which is hereby incorporated by reference herein in its entirety.

FIELD OF THE PRESENT DISCLOSURE

The present disclosure relates generally to security systems, and more particularly, to wearable personal security devices and systems.

BACKGROUND

Individuals desire to avoid being the victim of theft, assault, battery, and other offenses. It has been acknowledged that one of the principal reasons an individual may be the subject of criminal offenses is due to the perception by the perpetrator that the individual is an "easy target." This determination is made upon the consideration of multiple factors, including the current status of the individual and the likelihood of avoiding the attention of police agencies and punishment. The present disclosure cannot alter the current status of an individual (e.g., transformation the individual into an aware, healthy, athletic adult located in a populated open space) but the present disclosure does aid in increasing the likelihood of a negative outcome for a would be perpetrator on account of a recorded wide field of view and dissemination of such information to one or more third-parties in a separate, remote location.

Prior wearable digital recording devices suffer from one or more disadvantages. For example, such devices generally suffer from a limited field of view focused in front of the wearer such that side and/or backward-looking images are not captured and/or data generated by such devices is physically stored on such devices such that any images actually captured can be eliminated by a perpetrator by disposing of and/or destroying/damaging the device. Hence, there remains a need for a device and system that provides a wide field of view and retrieval of the captured images and/or video and/or audio from an off-site or remote location.

Furthermore, other prior wearable digital recording devices require the manipulation of such device by the wearer's hand in order to obtain the desired benefits or are designed to subtly blend into the appearance of the wearer so as to not be easily noticeable by the public. These features, however, limit the effectiveness of such devices by either requiring activity by the wearer that may not be performed at the necessary moments in time or fail to signal to the perpetrator that the wearer is not an "easy target." Hence, there remains a need for an improved security device and system. The present disclosure is directed towards addressing these needs and other problems.

SUMMARY OF THE PRESENT DISCLOSURE

According to some implementations of the present disclosure, a security device includes a housing, a digital camera, an electronic storage medium, and a communication module. The digital camera is coupled to the housing and is configured to capture data. The electronic storage medium is coupled to the digital camera such that the electronic storage medium is configured to store the captured data therein. The communication module is configured to transmit the captured data according to an ordered sequence of data transmissions in response to the occurrence of a triggering event, the ordered sequence including (i) a first transmission of captured data including data captured prior to the triggering event, and (ii) a second transmission of captured data including data captured subsequent to the triggering event.

According to some implementations of the present disclosure, a wearable personal security device includes a protective housing, a plurality of digital cameras, a microphone, an electronic storage medium, and a communication module. The plurality of digital cameras is coupled to the protective housing, and each of the plurality of digital cameras is configured to capture data, including still images, video images, or both. The microphone is coupled to the protective housing and is configured to capture sounds. The electronic storage medium is coupled to the microphone and each of the plurality of digital cameras such that the electronic storage medium stores the captured data and the captured sounds therein. The communication module is coupled to the electronic storage medium and is configured to transmit at least a portion of the stored, captured data and at least a portion of the stored, captured sounds in response to the occurrence of a triggering event.

According to some implementations of the present disclosure, a wearable personal security device includes a protective outer housing, an inner housing, a plurality of digital cameras, a microphone, and a communication module. The protective outer housing includes an upper half having a trigger and a lower half being coupled to a clip. The inner housing includes a lower portion, a middle portion, and an upper portion, the inner housing being disposed within the protective outer housing. A first one of the plurality of digital cameras is coupled to the middle portion of the inner housing and a second one of the plurality of digital cameras is coupled to the upper portion of the inner housing. Each of the plurality of digital cameras is configured to capture data, including still images, video images, or both. The microphone is coupled to the upper half of the protective housing and is configured to capture sounds. The electronic storage medium is coupled to the microphone and each of the plurality of digital cameras such that the electronic storage medium stores the captured data and the captured sounds therein. The communication module is coupled to the electronic storage medium and is configured to transmit at least a portion of the stored, captured data and at least a portion of the stored, captured sounds in response to the occurrence of a triggering event.

According to some implementations of the present disclosure, a personal security system includes a wearable personal security device and an application. The wearable personal security device includes a protective housing, a plurality of digital cameras, a microphone, an electronic store medium, and a communication module. The plurality of digital cameras is coupled to the protective housing, and each of the plurality of digital cameras is configured to capture data, including still images, video images, or both. The microphone is coupled to the protective housing and is configured to capture sounds. The electronic storage medium is coupled to the microphone and each of the plurality of digital cameras such that the electronic storage medium stores the captured data and the captured sounds therein. The communication module is coupled to the electronic storage medium and is configured to transmit at least a portion of the stored, captured data and at least a portion of the stored, captured sounds in response to the occurrence of a triggering event. The application executes on a mobile device that is wirelessly coupled to the wearable personal security device. The executing application is configured to: receive, from the communications module of the wearable personal security device, at least a portion of the transmitted data and sounds; process, via a processor of the mobile device, the received data and sounds; store the processed data and sounds in a memory of the mobile device; and wirelessly transmit at least a portion of the processed data and sounds, via a communication module of the mobile device, to a remote server.

The present disclosure is susceptible to various modifications and alternative forms, and some representative implementations have been shown by way of example in the drawings and will be described in detail herein. It should be understood, however, that the inventive aspects of the disclosure are not limited to the particular forms disclosed. Rather, the disclosure is to cover all modifications, equivalents, and alternatives falling within the spirit and scope of the present disclosure as defined by the appended claims.

Figure 1:
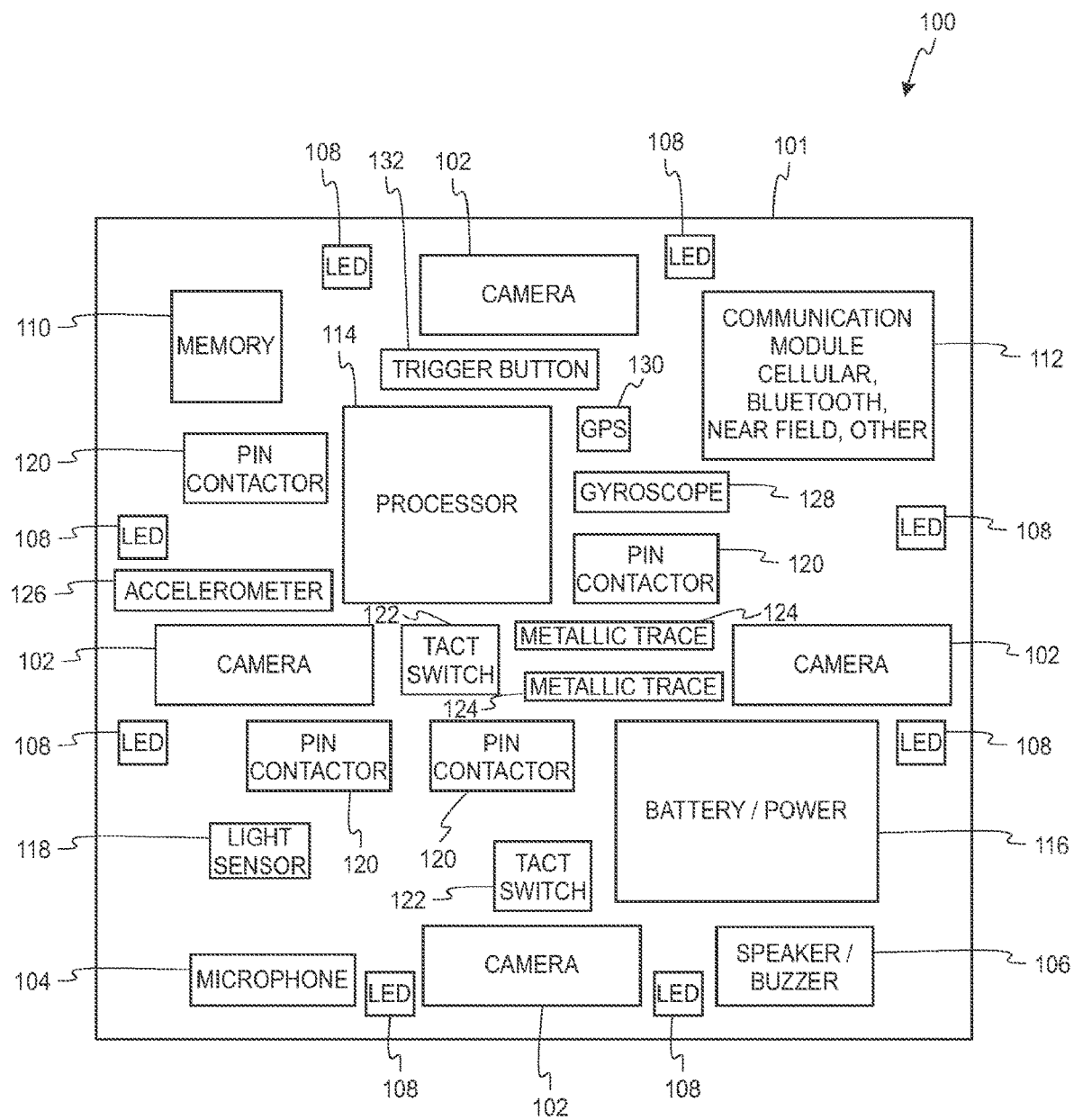
FIG. 1 is a schematic illustration of a wearable personal security device according to some implementations of the present disclosure.

While the present disclosure is susceptible to various modifications and alternative forms, specific embodiments and implementations are shown by way of example in the drawings and are described in detail herein. It should be understood, however, that the present disclosure is not intended to be limited to the particular forms disclosed. Rather, the present disclosure is to cover all modifications, equivalents, and alternatives falling within the spirit and scope of the present disclosure.

DETAILED DESCRIPTION

Referring to FIG. 1, a security device 100 includes a protective housing 101, a plurality of digital cameras 102, a microphone 104, a speaker 106, a plurality of light-emitting diodes ("LEDS") 108, an electronic storage medium 110, a communication module 112, a processor 114, and a battery/power supply 116. Generally, the security device 100 is used to record images and sounds of the surrounding environment then store and/or disseminate such recordings (e.g., to a third party monitoring service, police, etc.). As such, the security device 100 can be used to decrease the likelihood of a crime being committed against a user of the device or against property and/or third parties generally in the vicinity of the device.

Each of the plurality of digital cameras 102 is coupled to the protective housing 101 and captures data from the surrounding environment, including still images, video images, or both. Further, each of the plurality of digital cameras 102 is communicatively coupled to the electronic storage medium 110 and transmits the captured data to the electronic storage medium 110 for storage therein. While the plurality of digital cameras 102 is shown as including four digital cameras, any number of digital cameras is possible, such as, for example, only one camera, only two cameras, six cameras, ten cameras, twenty cameras, etc. The plurality of digital cameras 102 can consist of the same or different types of digital cameras, such as, for example, digital cameras that only record still images, digital cameras that only record video images, digital cameras that record still images and video images, high definition cameras, low resolution cameras (e.g., cameras that produce "security quality" images), cameras with a fish eye lens (e.g., a 180 degree fish eye lens), cameras with or without zooming ability (optical and/or digital zoom), or the like, or any combination thereof. Further, each of the plurality of digital cameras 102 can be selected such that the captured still images or video images have a desired resolution and/or file size (i.e., 0.1 Mb, 1 Mb, 10 Mb, 50 Mb, etc.)

The microphone 104 is coupled to the protective housing 101 and captures sounds from the surrounding environment. The microphone 104 is communicatively coupled to the electronic storage medium 110 such that the captured sounds are transmitted to the electronic storage medium 110 for storage. The microphone 104 can be selected such that it has a desired gain for recording sound from the surrounding environment. Further, while the security device 100 is shown as having one microphone, the device can include any number of microphones to increase the likelihood of capturing all sounds from the surrounding environment (e.g., two microphones, five microphones, etc.).

As described above, the electronic storage medium 110 is communicatively coupled to the plurality of digital cameras 102 and the microphone 104 and stores captured data and/or captured sounds. The electronic storage medium 110 can be any mass storage device, such as, for example, a hard disk drive, a solid state drive, a secure digital ("SD") card, or the like, or any combination thereof. Further, the storage capacity of the electronic storage medium 110 can be selected such that it can store a desired amount of data and sounds before requiring deletion and/or overwriting of previously stored data/sounds in order to store newly captured data and/or sounds.

The communication module 112 is communicatively coupled to the electronic storage medium 110 and transmits at least a portion of the captured data and/or captured sounds stored in the electronic storage medium 110 to a remote device (e.g., a server, a computer, a tablet a smartphone, etc.). Alternatively or additionally, the communication module 112 can be directly coupled to the plurality of digital cameras 102 to permit transmission of real-time data captured by the plurality of digital cameras 102. The communication module 112 is communicatively coupled to the remote device via, for example, a cellular network, a Wi-Fi network, near-field communication, an RFID connection, a Bluetooth connection, or the like, or any combination thereof. Alternatively, the communication module 112 can be communicatively coupled to the remote device via a hard-wired connection (e.g., via a micro USB cable). The remote device receives the transmitted portion of the stored images and/or stored sounds and in some implementations permits a user of the remote device to view, analyze, and/or manipulate the captured data and/or sound. In some other implementations, the user is prevented from accessing, viewing, analyzing, manipulating, etc. the captured data and/or sound. In some implementations, in an effort to prevent tampering with the data and/or audio by unwanted individuals (e.g., a robber, etc.), the user is only permitted to access, view, analyzing, manipulating, etc. the captured data and/or sound when certain predetermined events occur (e.g., when the user is at home, at work, when the security device 100 is hard wired to a computer, etc. or any combination thereof).

The processor 114 is communicatively coupled to the plurality of digital cameras 102, the microphone 104, the speaker 106, the plurality of LEDs 108, the electronic storage medium 110, the communication module 112, the power supply 116, and/or any of the other components of the security device 100. The processor 114 executes instructions stored in the electronic storage medium 110 and controls the operation of the other components of the security device 100 to which it is communicatively coupled. The power supply 116 is electrically connected to the various components of the security device 100 and provides power to the components. The power supply 116 can be a disposable battery, a rechargeable battery, an external A/C power supply, an external D/C power supply, or the like, or any combination thereof.

The security device 100 also optionally includes a light sensor 118. The light sensor 118 measures the ambient light surrounding the security device 100. In some implementations, when the light sensor 118 measures an ambient light below a predefined value, the plurality of LEDs 108 illuminate to aid a user's vision and/or enhance the clarity of the captured data from the plurality of digital cameras 102. For example, the predefined value of ambient light that triggers illumination of the plurality of LEDs 108 can be less than fifty lux, less than twenty lux, less than ten lux, less than five lux, etc. Similarly, the plurality of LEDs 108 can also be used to notify third parties (e.g., a potential perpetrator of a crime) of the presence of the security device 100 in a dimly light environment by operating as strobe lights, and thus act as a deterrent.

The security device 100 also optionally includes a plurality of spring-loaded pin contactors 120 and a plurality of tactile switches 122. The security device 100 is designed to be affixed to a user's body, clothing, or accessories (e.g., a backpack, a purse, or the like). The optional plurality of spring-loaded pin contactors 120, the plurality of tactile switches 122, and a plurality of metallic traces 124 can be used to determine if the security device 100 has been removed from the user's clothing or accessory. For example, a first one of the plurality of spring-loaded pin contactors 120 and a second one of the plurality of spring-loaded contactors 120 are coupled to the protective housing 101 such that they are in direct contact with one of the plurality of metallic traces 124 when the device is not affixed to clothing or an accessory. When the first and second ones of the plurality of spring-loaded pin contactors 120 are in direct contact with the metallic trace 124, they create a completed electrical circuit. Thus, when the first and second ones of the plurality of spring-loaded contactors 120 are separated from the metallic trace 124 by, for example, a piece of fabric (i.e., a non-conductive material) from the user's clothing being positioned therebetween, the electrical circuit is interrupted and/or terminated. When the fabric is removed, the electrical circuit between the first and second ones of the plurality of spring-loaded pin contactors 120 and the metallic trace 124 is completed and serves an indicator that the device has been removed. The plurality of tactile switches 122 detect whether the device is affixed to the user in the same or similar manner by creating an electrical circuit that can serve as an indicator that the device has been removed from clothing or an accessory.

In some implementations, the security device 100 optionally includes an accelerometer 126, a gyroscope 128, and a GPS unit 130. The accelerometer 126 measures the acceleration of the security device 100 and the gyroscope 128 measures the angle or level of the security device 100. The GPS unit 130 determines a location of the wearable personal service device 100. The accelerometer 126, the gyroscope 128, and/or the GPS unit 130 can be communicatively coupled to one or more of the electronic storage medium 110 for storing captured data, the communication module 112 for transmitting captured data, and/or the processor 114 for processing captured data.

In some implementations, the security device 100 optionally includes a radar (not shown) and a microwave (not shown). The radar and/or microwave can be used in order to digitally map a space (e.g., a room, a house, etc.) and/or detect motion around the security device 100.

The components of the security device 100 described above can be configured to operate as described herein in response to the occurrence of one or more triggering events. Two examples of triggering events are (i) a manually activated security alert, and (ii) an automatically activated security alert. A manually activated security alert is activated by a user of the security device 100, when, for example, the user feels that a security risk is imminent. The user can create a manually activated security alert by various mechanisms, such as a trigger button 132 disposed on the protective housing 101.

Unlike a manually activated security alert, an automatically activated security alert is triggered without a user needing to take any affirmative action. Advantageously, an automatically activated security alert causes various components of the security device 100 to operate, even if the user is unaware of a security threat or is otherwise incapacitated. Examples of automatically activated security alerts include: (i) an acceleration of the security device 100 (measured by the accelerometer) above a predefined value (which may indicate that the user/wearer was put into a moving vehicle against his/her will), (ii) removal of the security device 100 from a user's clothing or accessory (as indicated by one or more of the plurality of spring-loaded pin contactors 120, the plurality of tactile switches 122, or metallic traces 124), (iii) the security device 100 being separated from a user's mobile device by a predefined distance (as determined by the GPS unit 130 and the processor 114), and (iv) an angle of the device (measured by the gyroscope 128) exceeds a predefined angle (e.g., the security device 100 is turned 90 degrees relative an original orientation, which may indicate that the user has fallen). In some implementations, the processor 114 performs a comparative analysis of the recorded data and/or recorded sound, and responsive to a predefined level of change, the processor 114 triggers an automatic security alert. For example, the processor 114 can perform a comparison of the recorded sound from the microphone 104 and a predefined volume (e.g., a volume which may indicate shouting or distress) or predefined sounds (e.g., a gunshot, predefined words or phrases, etc.) stored in the electronic storage medium 110. If the processor 114 determines that the recorded sound exceeds the predefined volume, of if the processor 114 identifies one of the predefined sounds, the processor 114 triggers an automatic security alert (described above). Similarly, the processor 114 can perform a comparison of the recorded data from the plurality of digital cameras 102 and previously recorded data stored in the electronic storage medium 110 (i.e., data recorded at a predefined interval prior to the currently recorded data) or a library of security-related images stored in the electronic storage medium 110 (e.g., images of weapons, images of known criminals, or any other image that may be indicative of a security threat, or the like). More particularly, when comparing the recorded data to previously recorded data, the processor 114 can compare a brightness of the recorded data (i.e., still images, video images, or both) and previously recorded data, in which case a lower brightness in the recorded data compared to the previously recorded data may indicate that a third party (e.g., a perpetrator) has entered the field of view of one of the plurality of digital cameras 102, or that the security device 100 has been moved. The processor 114 can trigger an automatic security alert based on the comparison of recorded data and previously recorded data, or if the processor 114 identifies one of the security-related images.

The one or more triggering events cause the same result whether the triggering event is a manually activated security alert or an automatically activated security alert. In some implementations, the plurality of digital cameras 102 and the microphone 104 only record data and/or sound respectively in response to a triggering event. For example, a user can press a trigger button 132 on the protective housing 101 to trigger a manually activated security alert which then causes the plurality of digital cameras 102 and the microphone 104 to begin capturing and/or storing data and/or sounds. Similarly, in some implementations, a triggering event causes: (i) all of the data and sound currently stored in the electronic storage medium 110 to be disseminated (e.g., wirelessly transmitted) to a remote device (e.g., a smartphone, a server, a computer, etc.) via the communication module 112, (ii) the plurality of LEDs 108 to operate as strobe lights at the highest illumination level, (iii) the GPS location (as determined by the GPS unit 130) to be disseminated (e.g., wirelessly transmitted) to a remote device via the communication module 112, (iv) the speaker 106 to emit a siren-like or other alarm sound, (v) or any combination thereof.

In some implementations, the stored, captured data and the stored, captured sounds transmitted by the communication module 112 responsive to the occurrence of a triggering event includes data and sounds captured (i) at the time of the triggering event, (ii) during a predefined period prior to the triggering event (e.g., ten seconds, thirty seconds, one minute, two minutes, etc.), and (iii) during a predefined period subsequent to the triggering event (e.g., ten second, thirty seconds, one minute, two minutes, etc.). For example, the communication module 112 can transmit stored, captured data taken ten minutes before the triggering event, five minutes before the triggering event, one minute before triggering event, at the time of the triggering event, one minute subsequent to the triggering event, five minutes subsequent to the triggering event, and ten minutes subsequent to the triggering event, etc.

Similarly, in some implementations, the communication module 112 is configured to transmit the stored, captured data and/or the stored, captured sounds in an ordered sequence. If the perpetrator of an attack or crime in the vicinity of the security device 100 is aware of the device's presence and its capabilities, there is a strong likelihood that the perpetrator will attempt to delete the incriminating data and/or sounds stored therein or otherwise prevent their transmission (e.g., by destroying the security device 100). To that end, a perpetrator may be able to destroy the device and prevent transmission of the relevant data/sounds (despite the protection offered by the protective housing 101). Thus, communication module 112 is configured to transmit data and sounds according to the ordered sequence of data transmissions in response to the occurrence of a triggering event in order to prioritize transmission of the most relevant captured data and sounds before the device can be destroyed, thereby increasing the likelihood of identifying perpetrator and increasing the overall deterrent effect of the security device 100.

The ordered sequence generally includes one or more separate transmissions (e.g., two transmissions, four transmissions, twenty transmissions, one hundred transmissions, etc.). For example, the ordered sequence can include (i) a first transmission of captured data including data captured prior to the triggering event, and (ii) a second transmission of captured data including data captured subsequent to the triggering event. Alternatively, the second transmission of captured data can include data captured contemporaneous with the triggering event. In addition, the ordered sequence can further include (iii) a third transmission of captured data including additional data captured prior to the captured data of the first transmission; and (iv) a fourth transmission of captured data including additional data captured subsequent to the captured data of the second transmission. More specifically, the captured data of the various transmissions (i.e., the first transmission, second transmission, etc.) can be data captured at predefined interval (e.g., 0.5 seconds, three seconds, ten seconds, one minute, five minutes, etc.) prior to and/or subsequent to the triggering event. Further, in some implementations, the second transmission of captured data and the fourth transmission of captured data is each a transmission of real-time data (e.g., streaming data in a real-time fashion with and/or without the real-time data being stored locally).

Generally, data and/or sounds captured immediately before and after to the triggering event (e.g., a manually activated security alert) will be the most relevant and are thus a priority for transmission. Thus, in accordance with the principles described above, in some implementations, the first transmission includes data captured, for example, one second before the triggering event, the second transmission includes real-time data, the third transmission includes data captured, for example, five seconds before the triggering event, and the fourth transmission includes real-time data. In this manner, the ordered sequence prioritizes data and/or sounds captured immediately prior to the triggering event (i.e., data most likely to show the approach of the perpetrator) and immediately subsequent to the triggering event (i.e., data most likely to show the perpetrator committing a crime or fleeing). The communication module 112 continues to transmit captured data and/or sounds in accordance with the ordered sequence for a predefined amount of time (e.g., five minutes, thirty minutes, one hour, etc.) or until the device is destroyed.

In some implementations, the transmitted data of the transmissions of the ordered sequence described above (i.e., the first transmission, the second transmission, etc.) includes one or more compressed, encrypted still images. Compressed still images are advantageous because of their relatively small file size (e.g., between about 0.3 Mb and 1 Mb). Generally, the transmission of the captured data and/or sounds by the communication module 112 to a remote device (e.g., a mobile device or remote server) is limited by the connection speed. Thus, compressed, still images are advantageous because more images can be transmitted in a short amount of time, which increases the likelihood that all relevant data will be transferred before a perpetrator can destroy or otherwise disable the security device 100. In other implementations, the transmitted data can include video images of a predefined duration (i.e., one second, three seconds, ten seconds, etc.), or a combination of still images and video images.

In some implementations, the security device 100 transmits data and/or sounds according to an order sequence. The ordered sequence includes a first transmission that occurs first in time that includes data captured prior to the triggering event. The first transmission includes, for example, one or more still pictures (e.g., one, two, three, four, etc.) and/or one or more video clips (e.g., a one second video clip, a two second video clip, etc.) captured prior to the triggering event occurring. The order sequence includes a second transmission that occurs second in time (i.e., after the first transmission is completed) that includes data captured subsequent to the triggering event. The second transmission includes, for example, one or more still pictures (e.g., one, two, three, four, etc.) and/or one or more video clips (e.g., a one second video clip, a two second video clip, etc.) captured subsequent to the triggering event occurring. In some implementations, second transmission includes for real-time data that is streaming, which may or may not be stored in the security device 100 prior to transmission or ever. The ordered sequence can include any number of additional transmissions. For example, additional transmissions can include a third transmission that occurs third in time (i.e., after the second transmission is completed) that includes data captured prior to the triggering event and prior to the data included in the first transmission. Similarly, the ordered can include a fourth transmission that occurs fourth in time (i.e., after the third transmission is completed) that includes data captured subsequent to the triggering event and subsequent to the data included in the second transmission.

Similarly, in other implementations, the plurality of digital cameras 102 only captures still images and the processor 114 is configured to create a detailed storyboard of an event using the captured still images taken at predefined intervals. The storyboard can provide a portrayal of the event using imagery and/or sound from the location of the event. Advantageously, the storyboard requires reduced storage capacity of the electronic storage medium 110, minimizes the volume of captured, recorded data that the communication module 112 transmits, decreases power consumption from the power supply 116, and frees up the processor 114 for other tasks.

The captured, stored data and captured, stored data in the electronic storage medium 110 may include highly personal or sensitive information, such as the user's whereabouts and recent activities, and in general anything seen or heard by the user when the plurality of digital cameras 102 and microphone 104 are recording. In some implementations, the captured, stored data and the captured, stored sounds can be encrypted while stored in the electronic storage medium 110. In such implementations, the stored data and the stored sounds are not accessible by the user. Instead, for example, the stored data and sounds are only accessible subsequent to being transmitted by the communication module 112 to an authorized remote server. The encryption protects the captured data and sound stored on the security device 100 from being accessed by an unauthorized individual should, for example, the security device 100 become lost or stolen.

While the security device 100 is shown as including all of the components described above, more or fewer components can be included in a wearable personal security device. For example, an alternative wearable personal security device (not shown) includes the protective housing 101, the plurality of digital cameras 102, the microphone 104, the speaker 106, the plurality of LEDs 108, the electronic storage medium 110, the communication module 112, the processor 114, and the power supply 116. Thus, various wearable personal security devices can be formed using any portion of the basic components described herein.

Figure 2:
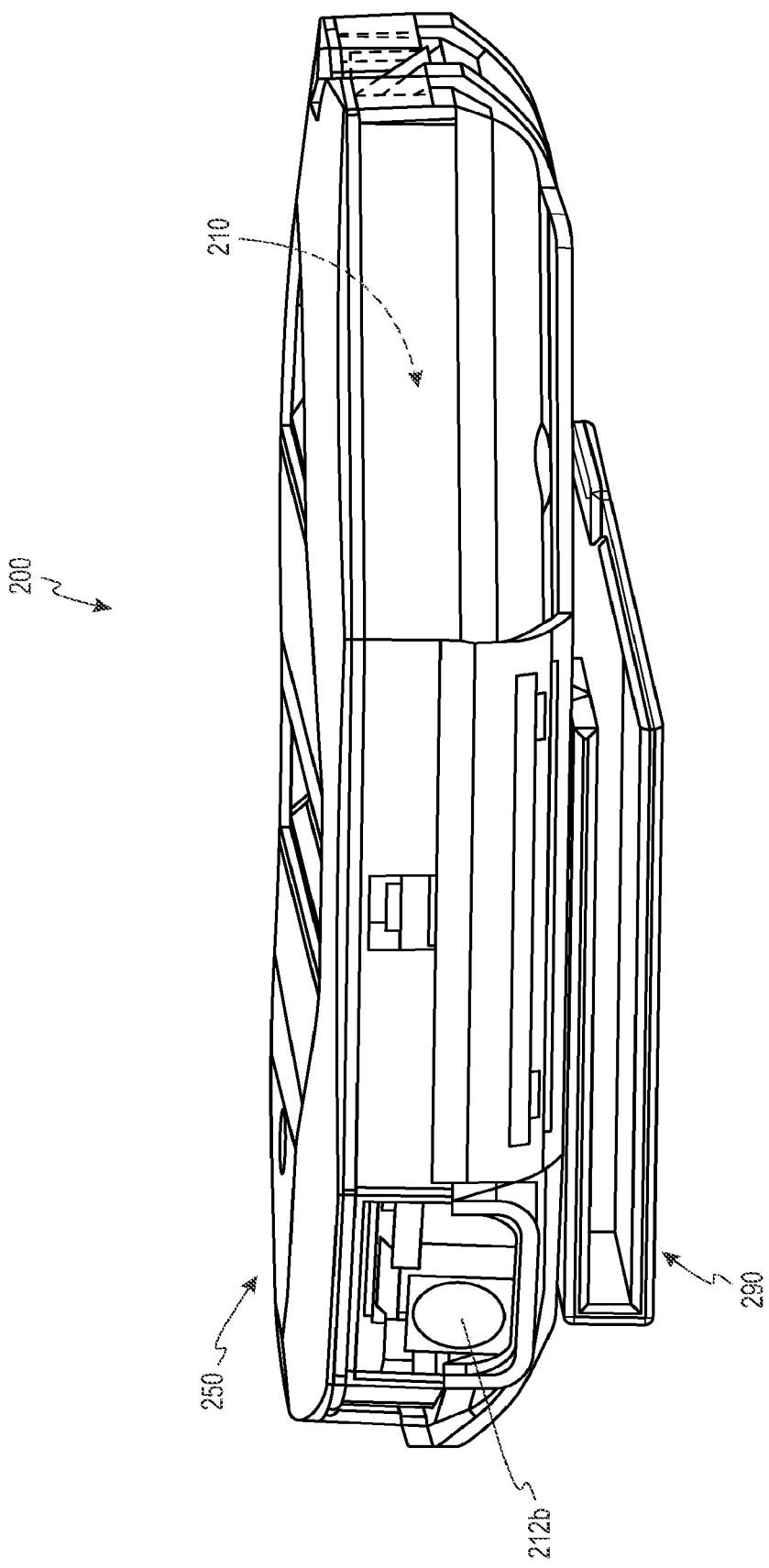
FIG. 2 is a perspective view of a wearable personal security device according to some implementations of the present disclosure.

Referring to FIG. 2, a wearable personal security device 200 that is the same as, or similar to, the security device 100, includes an inner housing 210, a protective outer housing 250, and a clip 290. The wearable personal security device 200 differs from the security device 100 in that the wearable personal security device 200 includes the inner housing 210 and the protective outer housing 250, rather than the single protective housing 101. Generally, the wearable personal security device 200 is used in the same or similar manner as the security device 100, and can include more or fewer components than security device 100. The wearable personal security device 200 also includes a plurality of digital cameras that is the same as, or similar to, the plurality of digital cameras 102 of the security device 100 described above. As shown, the plurality of digital cameras includes four digital cameras: a first digital camera 212a, a second digital camera 212b, a third digital camera 212c, and a fourth digital camera 212d.

Figure 3A:
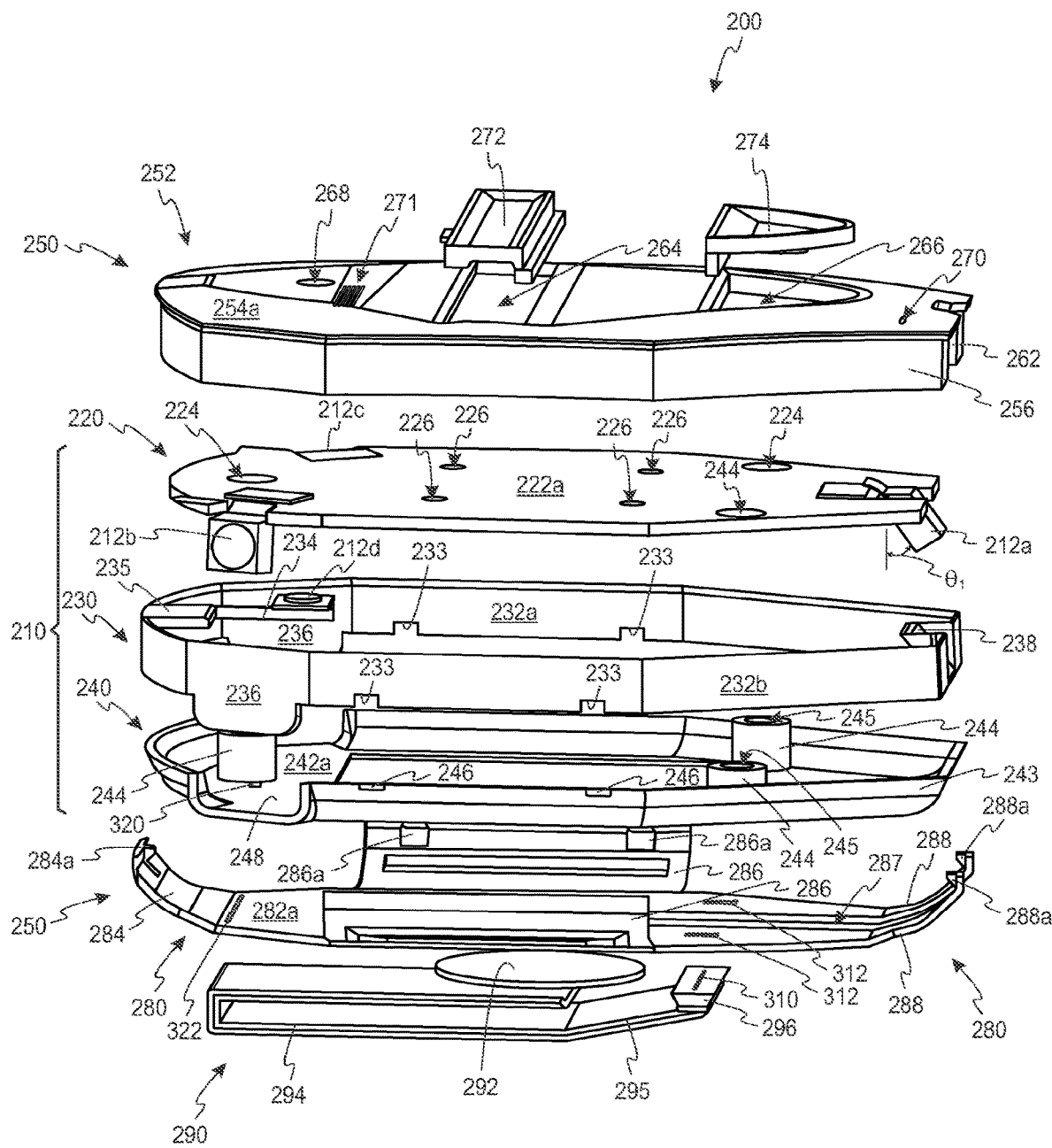
FIG. 3A is a exploded perspective view of the wearable personal security device of FIG. 2.
Figure 3B:
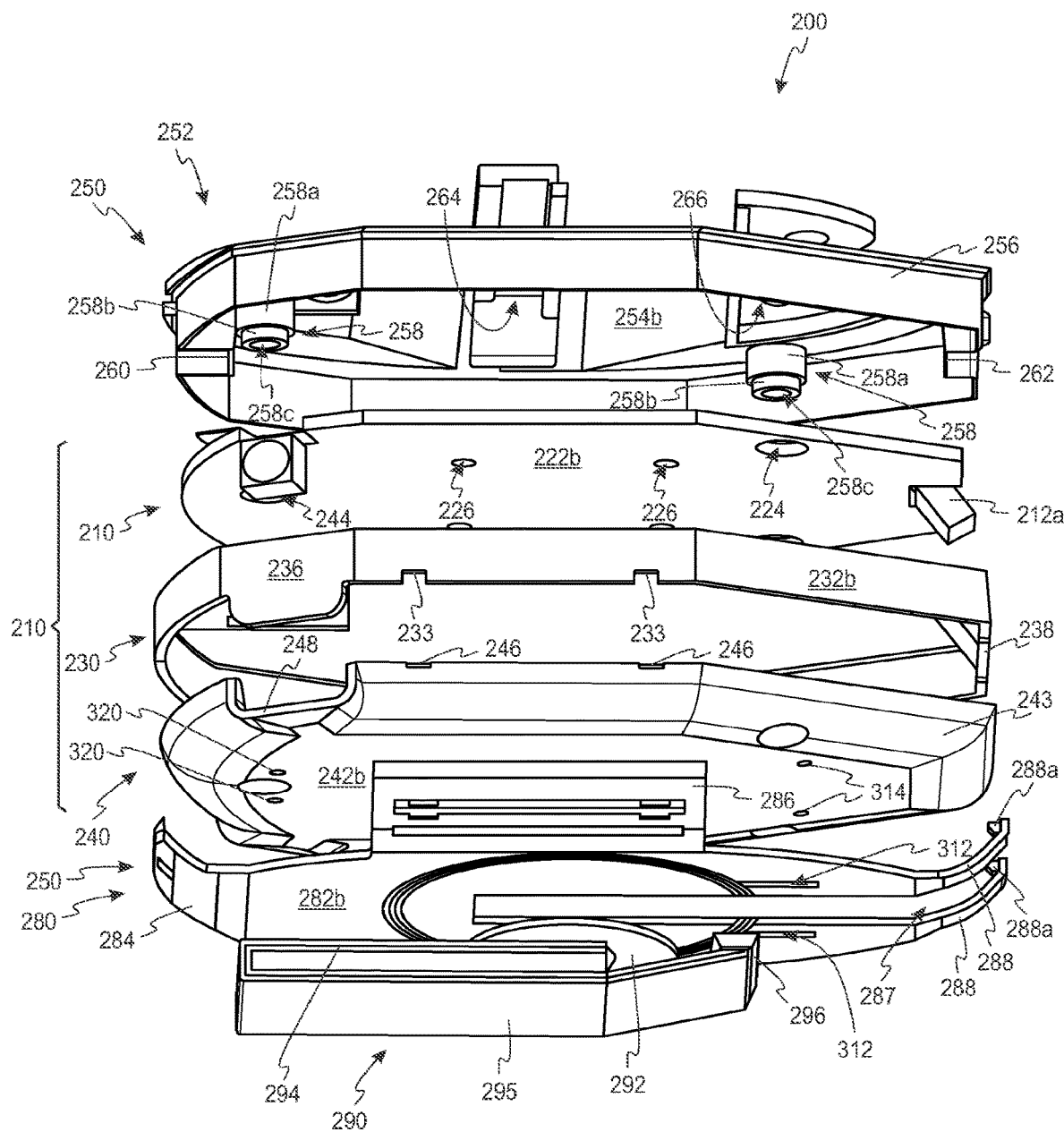
FIG. 3B is another exploded perspective view of the wearable personal security device of FIG. 2.

Referring generally to FIGS. 3A and 3B, the inner housing 210 includes a top portion 220, a middle portion 230, and a bottom portion 240. Generally, the top portion 220, the middle portion 230, and the bottom portion 240 are stacked together to form the inner housing 210. While the top portion 220, the middle portion 230, and bottom portion 240 are shown as separate components, the inner housing 210 can be a single monolithic component (i.e., the top portion 220, the middle portion 230, and the bottom portion 240 are unitary).

The top portion 220 includes a top surface 222a (FIG. 3A), a bottom surface 222b (FIG. 3B), a first plurality of apertures 224, and a second plurality of apertures 226. Each of the first plurality of apertures 224 and each of the second plurality of apertures 226 extend between the top surface 222a (FIG. 3A) and the bottom surface 222b (FIG. 3B). The first digital camera 212a, the second digital camera 212b, and the third digital camera 212d are coupled to the top portion 220. As shown, the first digital camera 212a and the second digital camera 212b are coupled to the top portion 220 such that they extend from the bottom surface 222b and are orientated generally perpendicular to the top and bottom surfaces 222a, 222b (e.g., parallel with a vertical axis of the top portion 220). As best shown in FIG. 3A, the third digital camera 212c is coupled to the top portion 220 such that it is orientated at an angle $\theta_1$ relative to a vertical axis of the top portion 220. As shown, the angle $\theta_1$ is approximately 45 degrees, however, other values for angle $\theta_1$ are possible, such as, for example, 5 degrees, 15 degrees, 30 degrees, 60 degrees, 75 degrees, etc.

When the inner housing 210 is assembled, the top portion 220 is stacked on top of the middle portion 230, and more particularly, the support arm 234 and fourth digital camera 212d (FIG. 3A). Thus, at least a portion of the top portion 220 is made from a transparent or semi-transparent material, such as, for example, a glass material, a polymer material (e.g., polycarbonate), or the like, or any combination thereof. Alternatively, the inner housing 210 can be assembled such that the top surface 222a of the top portion 220 is positioned underneath the support arm 234 and the fourth digital camera 212d. In such implementations, the top portion 220 can be made from a transparent, semi-transparent, or opaque material (e.g., a metal material, a polymer material, or the like).

The middle portion 230 includes an inner surface 232a, an outer surface 232b, a plurality of notches 233, a support arm 234 (FIG. 3A), an LED 235 (FIG. 3A), a pair of camera windows 236, and an angled recess 238. The support arm 234 extends from the inner surface 232a towards the angled recess 238 and is coupled to and supports the fourth digital camera 212d and the LED 235. As best shown in FIG. 3A, the fourth digital camera 212d is oriented such that it is generally perpendicular to the inner surface 232a and the outer surface 232b (i.e., generally perpendicular to the orientation of the first, second, and third digital cameras 212a, 212b, 212c).

Each of the plurality of notches 233 of the middle portion 230 have a generally rectangular configuration, and while shown as having four notches, any number of notches is possible (e.g., 2 notches, 6 notches, 10 notches, etc.). The angled recess 238 is sized and shaped such that it receives the third digital camera 212c when the top portion 220 is stacked on top of the middle portion 230 when the inner housing 210 is assembled. Thus, the angled recess 238 has an angle that is approximately the same as the angle $\theta_1$ of the third digital camera 212d (described above). Each of the pair of camera windows 236 is made from a transparent or semi-transparent material (e.g., glass, polycarbonate, or the like, or any combination thereof). When the inner housing 210 is assembled, the first digital camera 212a and the second digital camera 212b are covered by the plurality of camera windows 236, and the transparent or semi-transparent material permits the first digital camera 212a and the second digital camera 212b to capture images, while aiding in protecting the digital cameras from being damaged.

The bottom portion 240 includes a top surface 242a, a bottom surface 242b, a sidewall 243, a plurality of locking columns 244, a plurality of notches 246, and a pair of generally "U"-shaped slots 248. As best shown in FIG. 3A, the plurality of locking columns 244 extend from the top surface 242a and have a generally cylindrical configuration. Further, each of the plurality of locking columns 244 has a generally central aperture 245. The plurality of notches 246 is similar to the plurality of notches 233 of the middle portion 230 in that each of the plurality of notches 246 has a generally rectangular configuration. As shown, the plurality of notches 246 of the bottom portion 240 and the plurality of notches 233 of the middle portion 230 are orientated relative to one another such that corresponding ones of the plurality of notches 246 and the plurality of notches 233 form a respective opening in the inner housing 210 when assembled (i.e., the top portion 220 is stacked on top of the middle portion 230). Each of the pair of generally "U"-shaped slots 248 is sized and shaped to receive the pair of camera windows 236 of the middle portion 230 when the inner housing 210 is assembled.

Referring generally to FIGS. 3A and 3B, the protective outer housing 250 includes an upper half 252 and a lower half 280. Generally, the protective outer housing 250 encases the inner housing 210 to aid in securing the top portion 220, the middle portion 230, and the bottom portion 240 to one another and protects the electronic components disposed within the inner housing 210.

The upper half 252 includes a top surface 254a, a bottom surface 254b, a sidewall 256, a plurality of locking columns 258, an light recess 260, a camera recess 262, a button aperture 264, a trigger aperture 266, a camera screen 268, a microphone aperture 270, a plurality of speaker slots 271, a push button 272, and a trigger button 274. As best shown in FIG. 3B, the sidewall 256 extends from the bottom surface 254b and along an outer edge of the upper half 252. The plurality of locking columns 258 (FIG. 3B) extend from the interior surface 154b in the same direction as the sidewall 256. The plurality of locking columns 258 are similar to plurality of locking columns 244 of the bottom portion 240 of the inner housing 210 described above in that they each have a generally cylindrical configuration and a generally central aperture 258c. However, the plurality of locking columns 258 differs from the plurality of locking columns 244 in that each of the plurality of locking columns 258 includes an upper portion 258a and a lower portion 258b. As shown, the upper portion 258a of each of the plurality of locking columns 258 has a diameter that is greater than a diameter of the lower portion 258b. The diameter of the lower portion 258b of each of the plurality of locking columns 258 is sized such that it can be disposed with a corresponding one of the first plurality of apertures 224 of the top portion 220 of the inner housing 210.

The light recess 260 (FIG. 3B) is sized and shaped to receive the LED 235 (FIG. 3A) of the middle portion 230 of the inner housing 210 when the device is assembled and permits light emitted from the LED to be visible through the top surface 254a of the upper half 252. Similarly, the camera recess 262 is sized and shaped to receive first digital camera 212a when the device is assembled.

The button aperture 264 has a generally rectangular configuration and receives the push button 272 therein, which also has a generally rectangular configuration. The trigger aperture 266 has a generally semi-circular configuration and receives the trigger button 274 therein, which also has a generally semi-circular configuration. Both the push button 272 and the trigger button 274 partially extend from the top surface 254a past the bottom surface 254b of the upper half 252.

The lower half 280 of the protective outer housing 250 includes a top surface 282a, a bottom surface 282b, a first arm 284, a pair of side arms 286, and a pair of end arms 288. As best shown in FIG. 3A, the first arm 284 generally extends up from the top surface 282a (i.e., away from the bottom surface 282b) and includes a pin 284a extending therefrom. Each of the pair of side arms 286 also extends up from the top surface 282a (i.e., away from the bottom surface 282b) and includes a pair of pins 286a. The pair of end arms 288 is separated from one another by a slot 287 and also generally extends up from the top surface 282a. The pair of end arms 288 also includes a pair of pins 288a.

To assembly the inner housing 210 and the protective outer housing 250, the top portion 220, the middle portion 230, and the bottom portion 240 of the inner housing 210 are stacked together as described above. The upper half 252 of the protective outer housing 250 is positioned on top of the top portion 220 such that the bottom portion 258b of each of the plurality of locking columns 258 engages a corresponding one of the first plurality of apertures 224 of the top portion 220. Because the diameter of the upper portion 258a of each of the plurality of locking columns 258 is greater than the diameter of the lower portion 258b and the plurality of apertures 224, each upper portion 258a contacts the top surface 222a of the top portion 220. Thus, there is a gap between the top portion 220 and the upper half 252. One or more of the various electronic components described above can be disposed with this gap (i.e., coupled to the top surface 222a. For example, a speaker (not shown) and a microphone (not shown) can be disposed in this gap such that the speaker is directly adjacent to the plurality of speaker slots 271 and the microphone is directly adjacent to the microphone aperture 270. The second plurality of apertures 226 permit these components to be connected to other electronic components disposing within the inner housing 210 (e.g., a processor, an electronic storage medium, a power supply, etc.). Similarly, the second plurality of apertures 226 permits the push button 272 and the trigger button 274 to be communicatively coupled to various electronic components disposed in the inner housing 210 (i.e., such that the push button 272 and/or trigger button 274 can be used to create a manually activated security alert).

When the inner housing 210 is assembled, the plurality of notches 233 and the plurality of notches 246 form corresponding openings in the inner housing 210. When the lower half 280 is assembled, the pair of pins 286a of each of the pair of side arms 286 engages a corresponding one of the openings formed in the inner housing 210, thereby aiding in securing the lower half 280 to the inner housing 210. Further, the pin 284a of the first arm 284 and the pair of pins 288a of the pair of end arms 288 engage the inner housing 210 to aid in securing the lower half 280 to the inner housing 210.

The clip 290 includes a base portion 292, a first arm portion 294, a flexible second arm portion 295, and a contactor 296. The base portion 292 has a generally circular configuration and is coupled to the bottom surface 282b (FIG. 3B) of the lower half 280 of the protective outer housing 250. While shown as having a generally circular configuration, other configurations for the base portion 292 are possible, such as, for example, a rectangular configuration, a triangular configuration, a polygonal configuration, or the like, or any combination thereof. The base portion 292 can be coupled to the bottom surface 282b by various mechanisms, such as, for example, an adhesive connection, a welded connection, a threaded connection, a pin and aperture system, a magnetic connection, a hook and loop fastener, or the like, or any combination thereof.

The first arm portion 294 is coupled to the base portion 292 and has a generally "L" shaped configuration. The second flexible arm portion 295 is coupled to the first arm portion 294 and includes a contactor 296. While the base portion 292, the first arm portion 294, and the second flexible arm portion 295 are unitary and/or monolithic, although various mechanisms for coupling these components are possible (e.g., a welded connection, an adhesive connection, or the like). Further, the clip 290 can be made from a polymer material, a metal material, or the like, or any combination thereof.

Figure 4A:
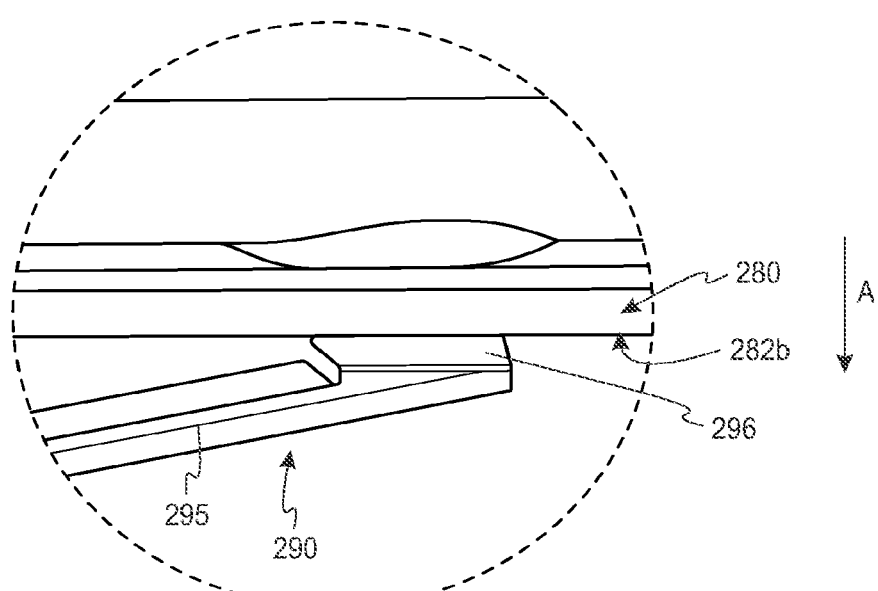
FIG. 4A is an enlarged partial perspective view of a clip of the wearable personal security device of FIG. 2 in a closed position.
Figure 4B:
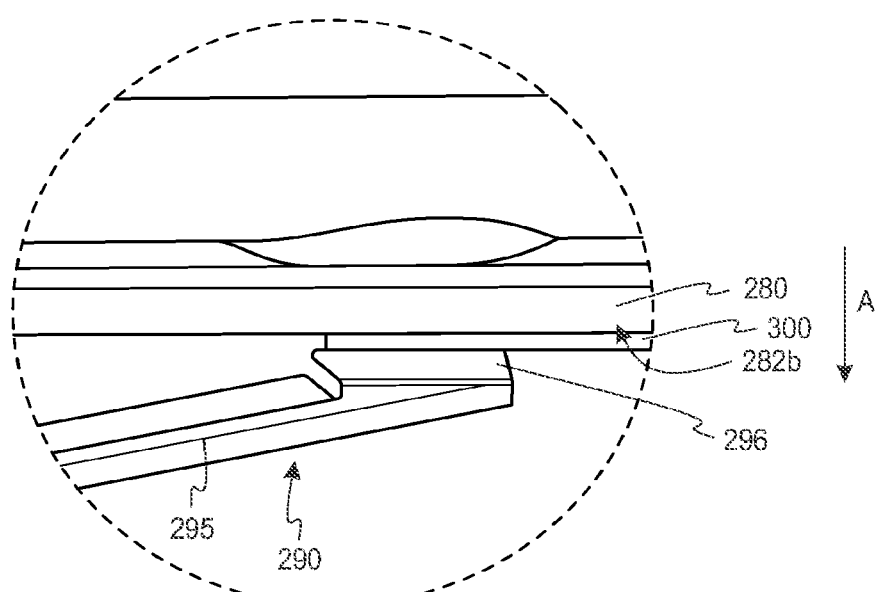
FIG. 4B is an enlarged partial detailed perspective view of the clip of FIG. 4A in an open position.

The clip 290 is generally used to secure the wearable personal security device 200 to a user's clothing and/or accessories (e.g., a backpack, a purse, a briefcase, or the like). Referring to FIG. 4A, the second flexible arm portion 295 urges the contactor 296 in the opposite direction of arrow A towards the bottom surface 282b of the lower half 280. Thus, the second flexible arm portion 295 maintains direct contact between the lower surface 282b and the contactor 296. When the second flexible arm portion 295 is moved in the direction of arrow A, the contactor 296 moves away from the bottom surface 282b and a gap is formed therebetween. Thus, as shown in FIG. 4B, a piece of fabric 300 (i.e., from a user's clothing or accessory) can be placed between the bottom surface 282b and the contactor 296. When the force is removed, the second flexible arm portion 295 urges the contactor 296 in the opposite direction of arrow A, thereby securing the fabric 300 between the contactor 296 and the bottom surface 282b, and thus the wearable personal security device 200 to the user's clothing/accessory.

While the wearable personal security device 200 is described above as being affixed to a user's clothing and/or accessories via the clip 290, other mechanisms for affixing the wearable personal security device 200 to the user's clothing/accessories without use of the clip 290 are possible. For example, the wearable personal security device 200 can be affixed to a sleeve or wrap (not shown) which is worn over an appendage of the user (e.g., an arm of the user), or disposed within a pocket or opening formed in the wrap/sleeve. In such implementations, the wrap/sleeve aids in keeping the wearable personal security device 200 affixed to the while the user moves the appendage (i.e., arm) during normal activities (e.g., running, walking, etc.). In some implementations, the positioning of the wearable personal security device 200 on the arm of the user aids the wearable personal security device 200 in collecting a wide range of images and/or video compared to a relatively more stationary positioning (e.g., the chest of the user) due to the movement of the cameras in the wearable personal security device 200.

Alternatively, in such implementations in which the wearable personal security device 200 does not include the protective outer housing 250, the inner housing 210 can be directly affixed to user's clothing by, for example, hoop and loop fasteners, a second clip that can be coupled to the bottom surface 242b of the bottom portion 240 of the inner housing 210, or the like, or any combination thereof.

In some implementations, the wearable personal security device 200 further includes a first circuit element 310 (FIG. 3A), a second circuit element 312, and a third circuit element 314 (FIG. 3B) for determining whether the device 200 is attached to a user's clothing and/or accessories. The first circuit element 310 (FIG. 3A) is coupled to the contactor 296 of the clip 290. The second circuit element 312 (FIGS. 3A and 3B) is coupled to the bottom surface 282b of the lower half 280 of the protective outer housing 250. The third circuit element 314 (FIG. 3B) is coupled to the bottom surface 242b of the bottom portion 240 of the inner housing 210. The first circuit element 310 (FIG. 3A), the second circuit element 312, and the third circuit element 314 (FIG. 3B) are electrical contacts that form a completed electrical circuit when the contactor 296 is in contact with the bottom surface 282b of the lower half 280 of the protective outer housing 250, as shown in FIG. 4B. When the wearable personal security device 200 is affixed to a user's clothing or accessory such that the clothing or accessory is positioned between the clip 290 and the protective outer housing 250 (i.e., fabric 300 shown in FIG. 4B), the electrical circuit between the first, second, and third circuit elements 310, 312, 314 is interrupted or terminated. The first, second, and third circuit elements 310, 312, 314 are communicatively coupled to a processor (not shown) and can trigger an automatically activated security alert when the device 200 is removed from the user's clothing. The each of the first, second, and third circuit elements 310, 312, 314 can be at least one of a spring-loaded pin contactor, a tactile switch, and/or a metallic trace that is the same as or similar to the plurality of spring-loaded pin contactor 120, the plurality of tactile switches 122, or the plurality of metallic traces 124 described above with respect to the security device 100.

Similarly, the wearable personal security device can optionally include a pair of spring-loaded pin contactors 320 (FIG. 3B) and a fourth circuit element 322 (e.g., a metallic trace) (FIG. 3A). The pair of spring-loaded pin contactors 320 is coupled to the bottom portion 240 of the inner housing 210 and extend through the bottom surface 242b thereof. The fourth circuit element 322 is coupled to the top surface 282a of the lower half 280 of the protective outer housing 250. When the protective outer housing 250 encases the inner housing 210, the fourth circuit element 322 and the pair of spring-loaded pin contactors 320 form a completed electric circuit. When the protective outer housing 250 is removed from the inner housing 210, the completed electric circuit between the pair of spring-loaded pin contactors 320 and the fourth circuit element 322 is interrupted or terminated, and can prompt a processor (not shown) to trigger an automatically activated security alert. In this manner, the pair of spring-loaded pin contactors 320 and the fourth circuit element 322 can be used to determine whether the protective outer housing 250 is removed from the inner housing 210 and trigger an automatic security alert.

In other implementations, instead of the pair of spring-loaded pin contactors 320, the wearable personal security device 200 can include a tactile switch (not shown) having a down or compressed position and a released position. When the protective outer housing 250 is coupled to the inner housing 210, the tactile switch and fourth circuit element 322 are in direct contact with one another, resulting in the tactile switch being in the down or compressed position. When protective outer housing 250 is separated from the inner housing 210, the tactile switch will be released completing an electric circuit. In such implementations in which the wearable personal security device 200 does not include the protective outer housing 250 such that the inner housing 210 is directly affixed to a user's clothing or accessories (such as through the use of hook and loop or touch fasteners), the tactile switch (or pair of spring-loaded pin contactors 320) would be incorporated into the fasteners or clothing on the user, which would then complete an electronic circuit that would be broken if the inner housing 210 was removed from the wearer. Any interruption of the circuit will trigger a security alert automatically; this will have the same effects as if a security alert was manually triggered.

Figure 5A:
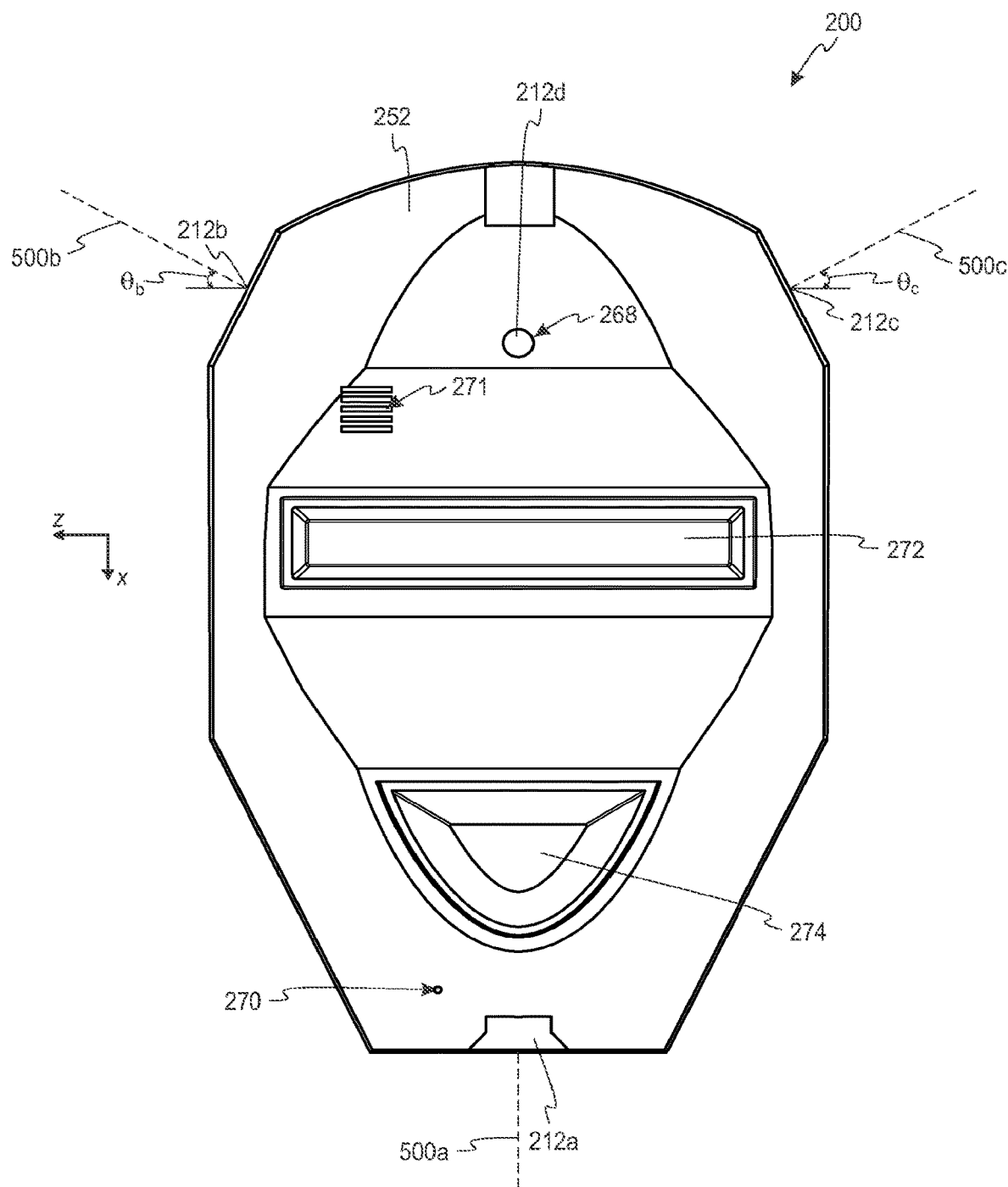
FIG. 5A is a plan view of the wearable personal security device of FIG. 2.

The first digital camera 212a, the second digital camera 212b, and the third digital camera 212c each have a respective field of view (shown in detail in FIGS. 6A-8B). Each respective field of view is the area surrounding the wearable personal security device 200 from which the digital camera can capture still or video images. Generally referring to FIGS. 5A. and 5B, and as best shown in FIG. 5A, the respective field of view of the first digital camera 212a has a central axis 500a, the respective field of view of the second digital camera 212b has a central axis 500b, and the respective field of view of the third digital camera 212c has a central axis 500c. The central axis 500b of the second digital camera 212b is orientated an at an angle θb relative to a z-axis of the wearable personal security device 200 and the central axis 500c is orientated at an angle θc relative to the negative z-axis. The angle θb can have a value ranging between about 0 degrees and about 75 degrees relative to the (positive) z-axis, and the angle θc can each have a value ranging between about 0 degrees and about 75 degrees relative to the negative z-axis. Desirably, and as shown, angles θb and θc are approximately 25 degrees relative to the positive and negative z-axes respectively. Further, in some implementations, the angles θb and θc can have a value ranging between about 0 degrees and about 45 degrees relative to a y-axis, rather than the z-axis as shown.

Figure 5B:
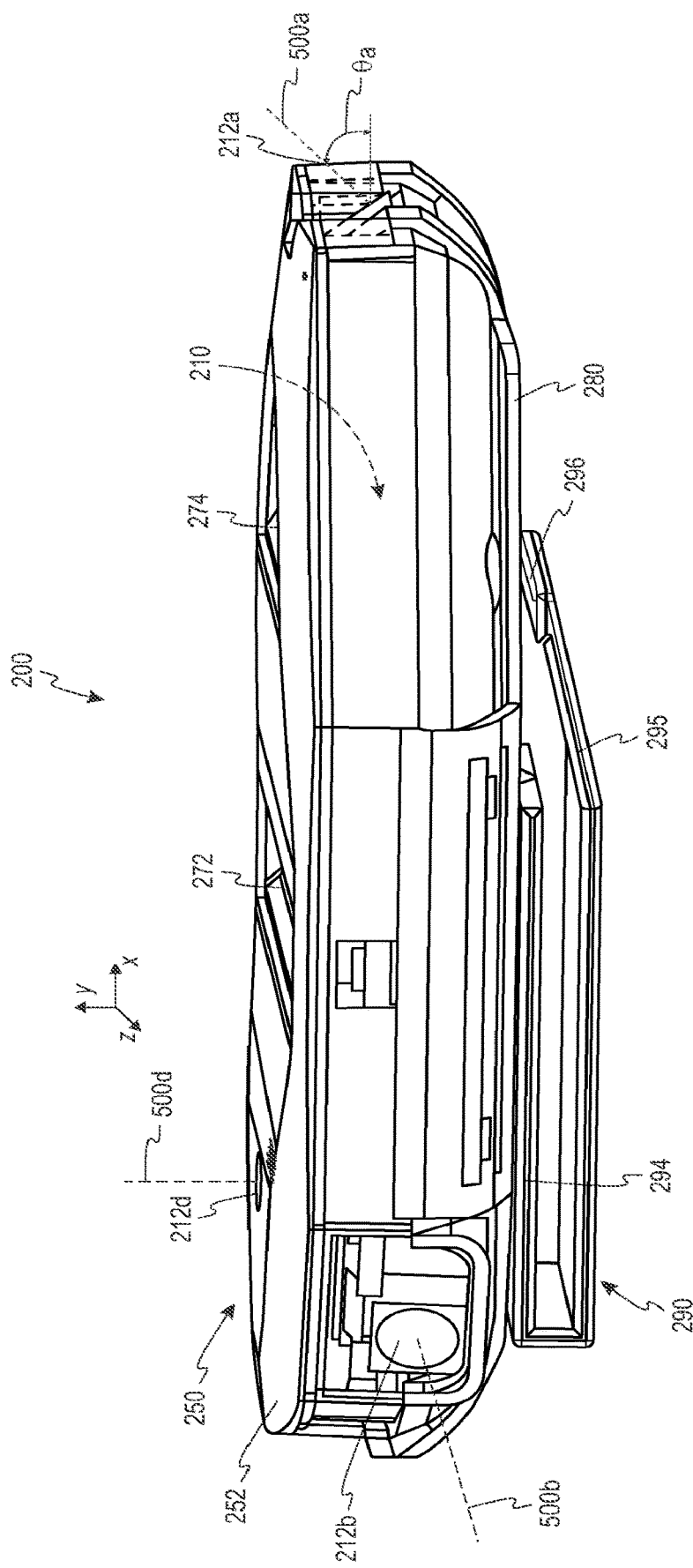
FIG. 5B is another perspective view of the wearable personal security device of FIG. 2 illustrating respective fields of view of a plurality of cameras.

As best shown in FIG. 5B, the fourth digital camera 212d also has a respective field of view with a central axis 500d. Desirably, and as shown, the central axis 500d is orientated parallel to the y-axis (i.e., at an angle of 0 degrees relative to the y-axis) of the wearable personal security device 200, and thus is thus orientated approximately 90 degrees relative to the second and third digital cameras 212b, 212c (i.e., relative to the x-axis and the z-axis). Alternatively, the central axis 500d can have an angle θd (not shown) having a value that ranges between about 0 degrees and about 75 degrees relative to the y-axis.

Referring to FIG. 5B, the central axis 500a of the first digital camera 212a is orientated at an angle θa relative to an x-axis of the wearable personal security device 200. The angle θa can range between about −75 degrees to about 75 degrees relative to the x-axis. Desirably, and as shown, the angle θa is approximately 45 degrees relative to the x-axis.

As shown in FIGS. 5A and 5B, digital cameras 212a, 212b, and 212d are orientated such that the central axes 500a, 500b, 500c of the respective fields of view are orientated at approximately 120 degrees relative to one another about the y-axis of the wearable personal security device 200. Advantageously, in this orientation, an aggregate field of view that includes each respective field of view described above allows the digital cameras 212a, 212b, and 212c to capture data from substantially 360 degrees around the wearable personal security device 200 when affixed to a user's clothing or accessory. Further, the central axis 500d of the respective field of view of the fourth digital camera 212d is orientated at approximately 90 degrees relative to central axes 500b and 500c and about 45 degrees relative to central axis 500a, further increasing the aggregate field of view.

FIGS. 6A-8B generally illustrate three likely options for how an individual may wear the wearable personal security device 200 described above. Regardless of how an individual elects to wear the device 200, FIGS. 6A-8B illustrate that the orientation of digital cameras 212a, 212b, 212c, and 212d relative to one another provides a broad aggregate field of view in multiple different vectors from the individual to capture images of, for example, a perpetrator approaching the individual from different directions. Accordingly, as the individual, or the applicable portion of the human body to which the device is attached or affixed, physically moves, the scope of coverage of the plurality of digital cameras also shifts. Thus, through the natural movement of the individual (e.g., walking, running, turning, etc.), each of the respective fields of field moves relative to its original position, thus aiding in expanding the aggregate field of view. In addition, the individual can deliberately move in order to specifically modify one or more of the respective fields of view to aid in providing a desired field of view for capturing data (e.g., still images and/or video clip(s)).

Figure 6A:
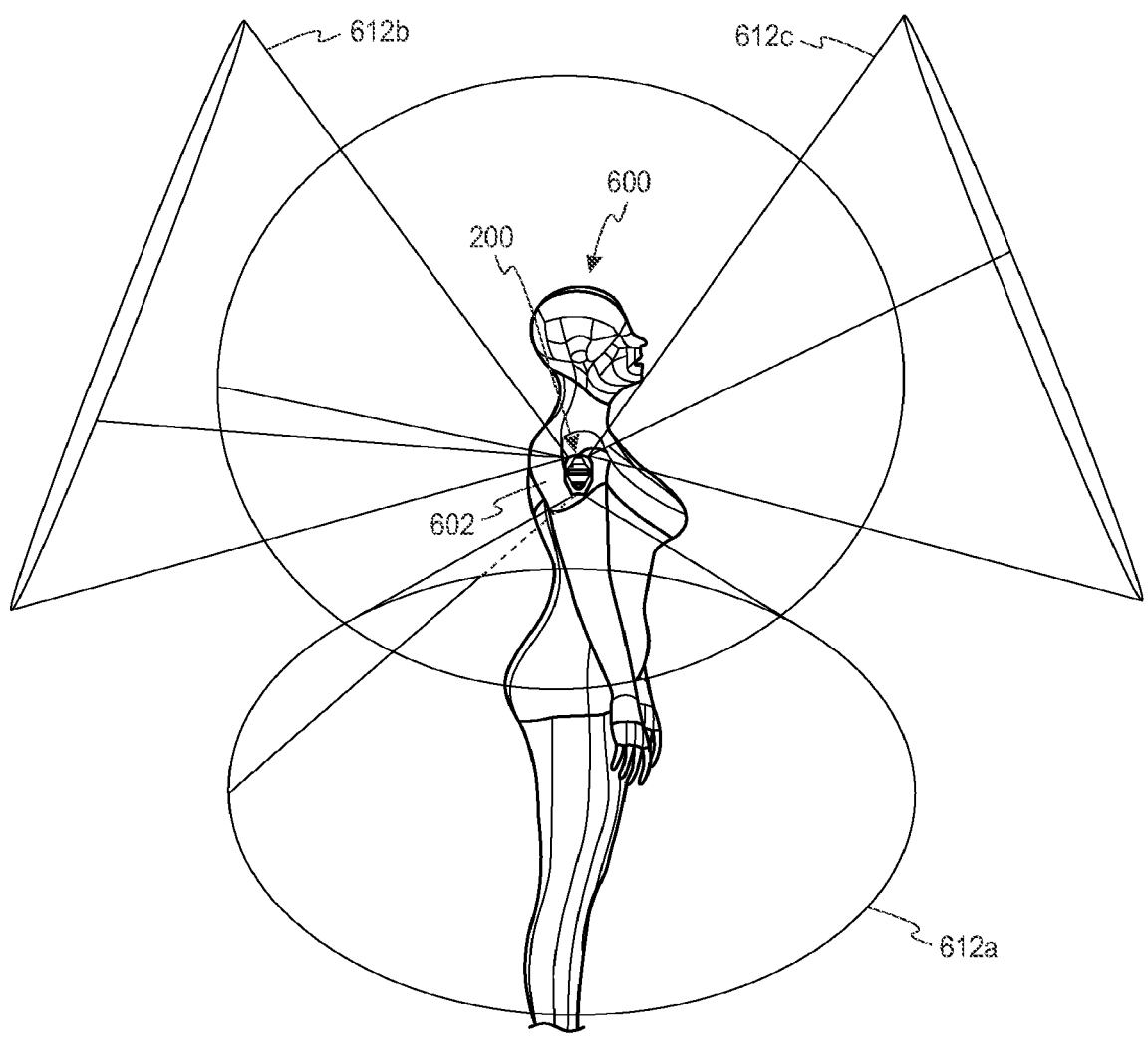
FIG. 6A is a side elevation view of the wearable personal security device of FIG. 2 affixed to a right arm of a user.
Figure 6B:
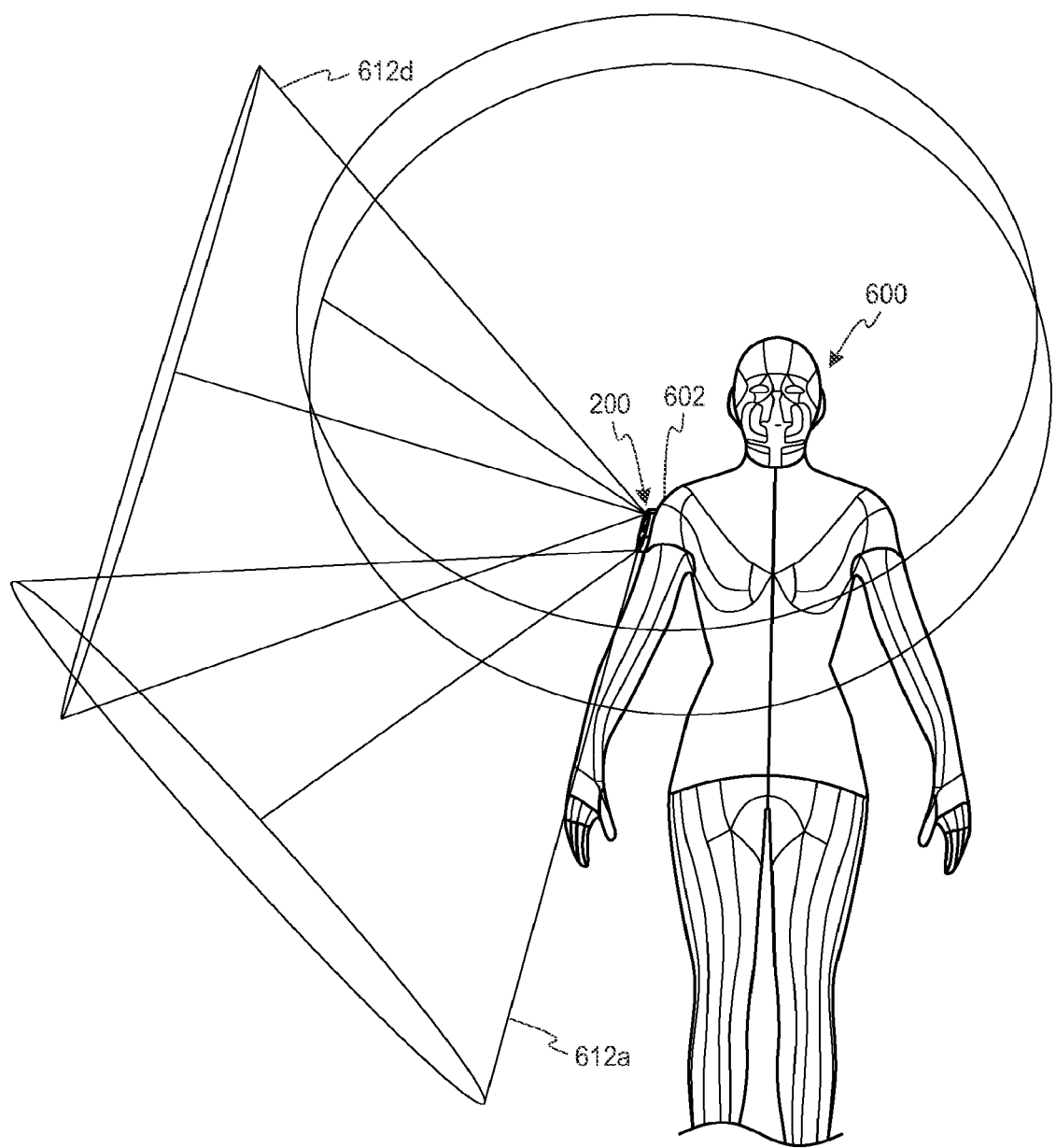
FIG. 6B is a front elevation view of the user of FIG. 6A.

Referring to FIGS. 6A and 6B, the wearable personal security device 200 is affixed to an upper arm 602 of an individual 600. In this configuration, the wearable personal security device 200 captures data (i.e., still images, video images, or both) from an aggregate field of view that includes the respective field of view 600a of the first digital camera 212a, the respective field of view 600b of the second digital camera 212b, the respective field of view 600c of the third digital camera 212c, and the respective field of view 600d of the fourth digital camera 212d. As best shown in FIG. 6A, respective fields of view 612b and 612c capture data from in front of and behind the individual 600. As best shown in FIG. 6B, respective fields of view 612a and 612d capture data from the side of the individual 600. Because the angle θa of central axis 500a (FIG. 4B) of the first digital camera 212a has a value of approximately 45 degrees relative to the x-axis, the respective field of view 612a of the first digital camera 212a captures data without being substantially obstructed or limited by a portion of the individual when the device is affixed to the upper arm 602. Specifically, if the angle θa was about 0 degrees relative to the x-axis, the individual's arm could substantially (or even completely) obscure or limit of the respective field of view of the first digital camera 212a when affixed to the upper arm 602, thereby restricting the aggregate field of view of the plurality of digital cameras.

As described above, movement of the individual 600 can modify one or more of the respective fields of view (i.e., the aggregate field of view) of the plurality of digital cameras. For example, as shown in FIGS. 6A and 6B, the respective fields of view 612a, 612b, 612c, and 612d are directed in front of the individual, behind the individual, and to the individual's right side, providing approximately 270 degrees of coverage around the individual. To capture data from the individual's left side, the individual can, for example, turn his or her chest/torso to his or her left, which will position the respective field of view 612c in the general direction of the individual's left side. Likewise, the individual can turn his or her chest/torso to his or her right, which will position the respective field of view 612d in the general direction of the individual's left side. In this manner, the individual's natural or deliberate movement can aid in providing a wider aggregate field of view.

In some implementations, the wearable personal security device 200 only includes the second digital camera 212b (not shown in FIGS. 6A and 6B) and the third digital camera 212c (not shown in FIGS. 6A and 6B). In such implementations, when worn on the upper arm 602 as shown in FIGS. 6A and 6B, the wearable personal security device 200 captures data from an aggregate field of view including the respective field of view 612b of the second digital camera 212b and the respective field of view 612c of the third digital camera 212c. Thus, the aggregate field of view in this implementation permits the wearable personal security device 200 to capture data from in front of and behind the individual 600, as best shown in FIG. 6A.

Figure 7A:
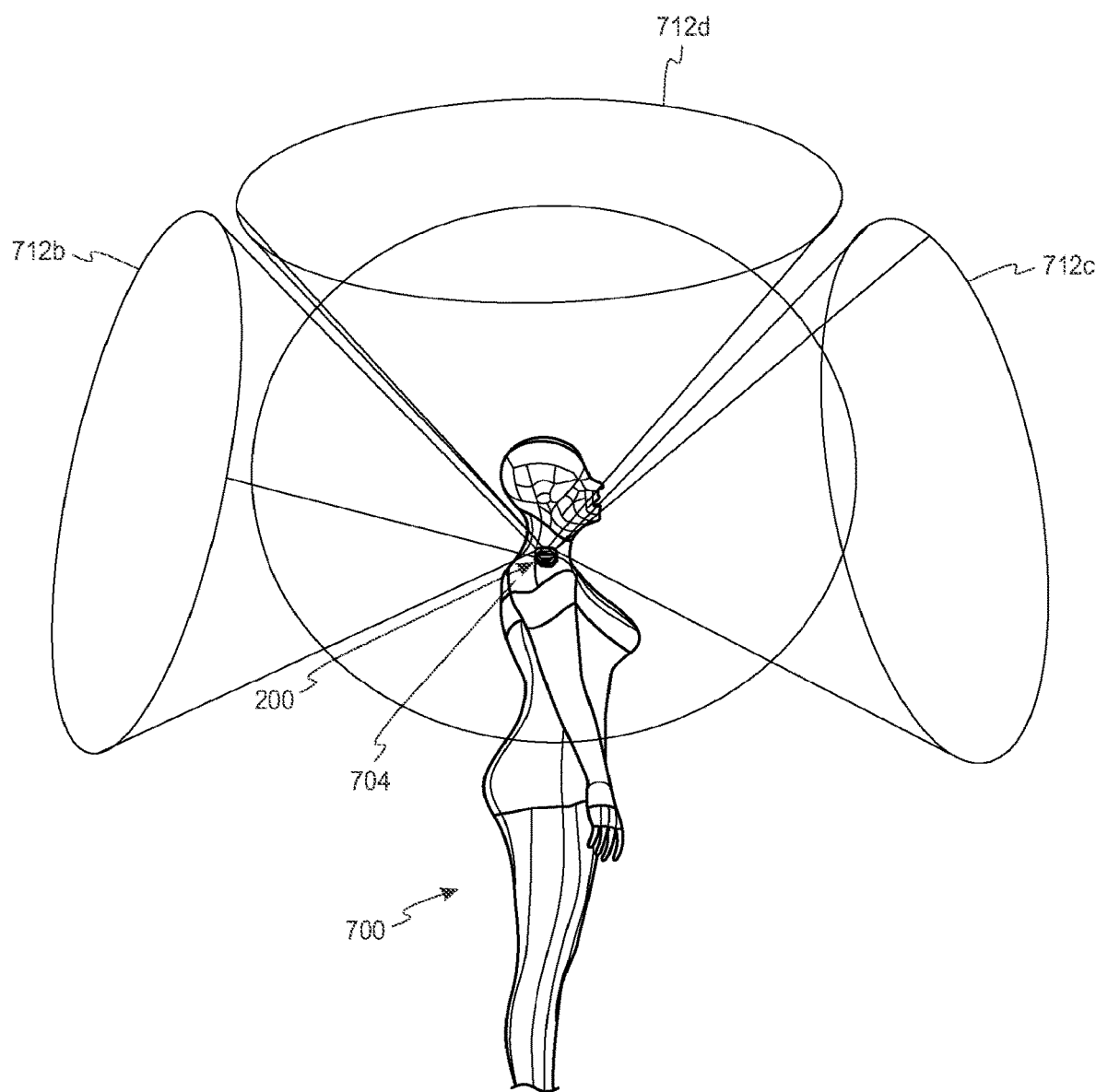
FIG. 7A is a side elevation view of the wearable personal security device of FIG. 2 affixed to a right shoulder of a user.
Figure 7B:
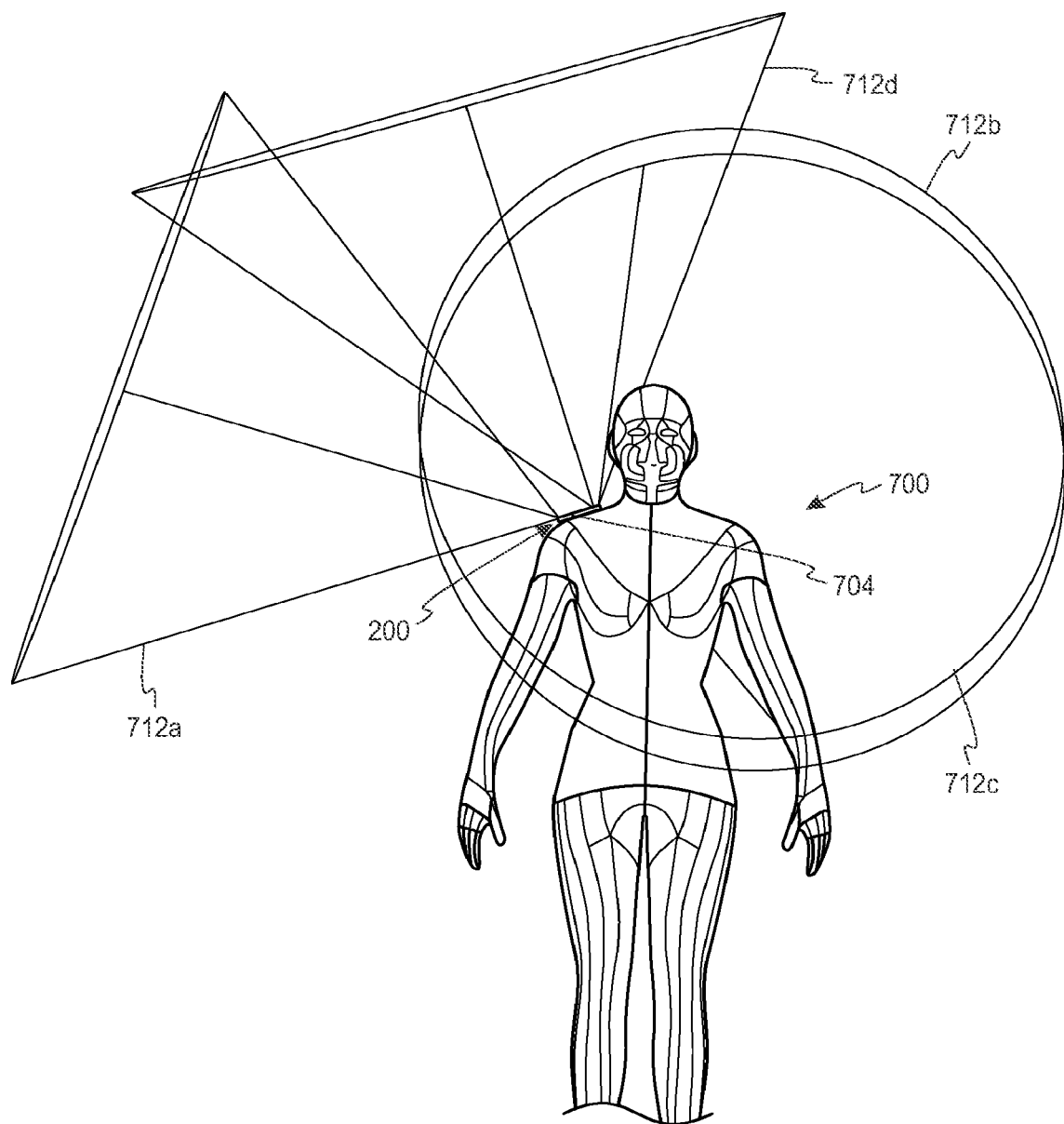
FIG. 7B is a front elevation view of the user of FIG. 7A.

Referring to FIGS. 7A and 7B, the wearable personal security device 200 is affixed to a shoulder 704 of an individual 700. In this configuration, the wearable personal security device 200 captures data (i.e., still images, video images, or both) from an aggregate field of view that includes the respective field of view 700a of the first digital camera 212a, the respective field of view 700b of the second digital camera 212b, the respective field of view 700c of the third digital camera 212c, and the respective field of view 700d of the fourth digital camera 212d. As best shown in FIG. 7A, respective fields of view 712b and 712c capture data from in front of and behind the individual 700. As best shown in FIG. 7B, respective field of view 712a captures data from the side of the individual 700, while the respective field of view 712d captures data from above the individual 700.

Figure 8A:
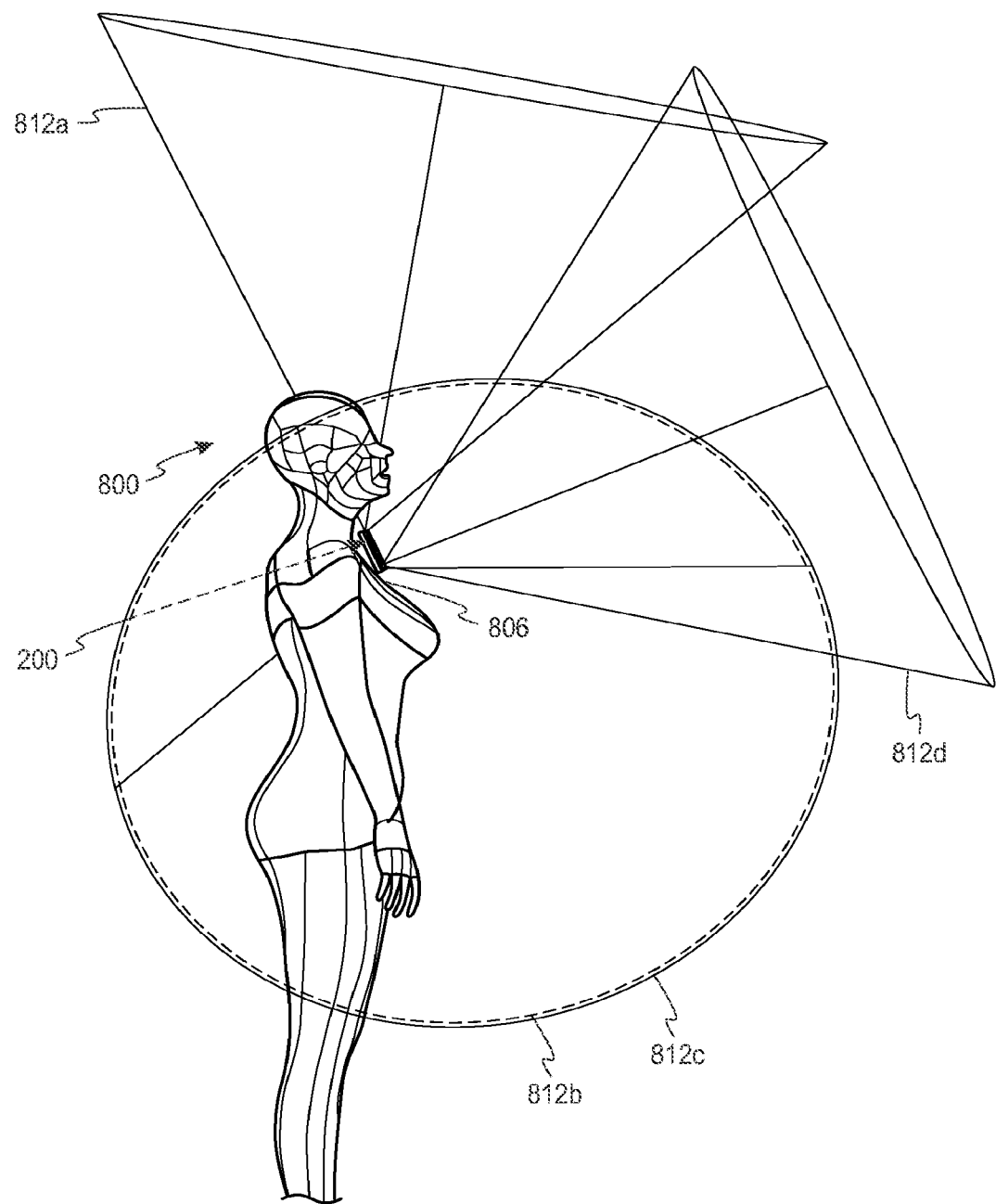
FIG. 8A is a side elevation view of the wearable personal security device of FIG. 2 affixed to a chest of a user.
Figure 8B:
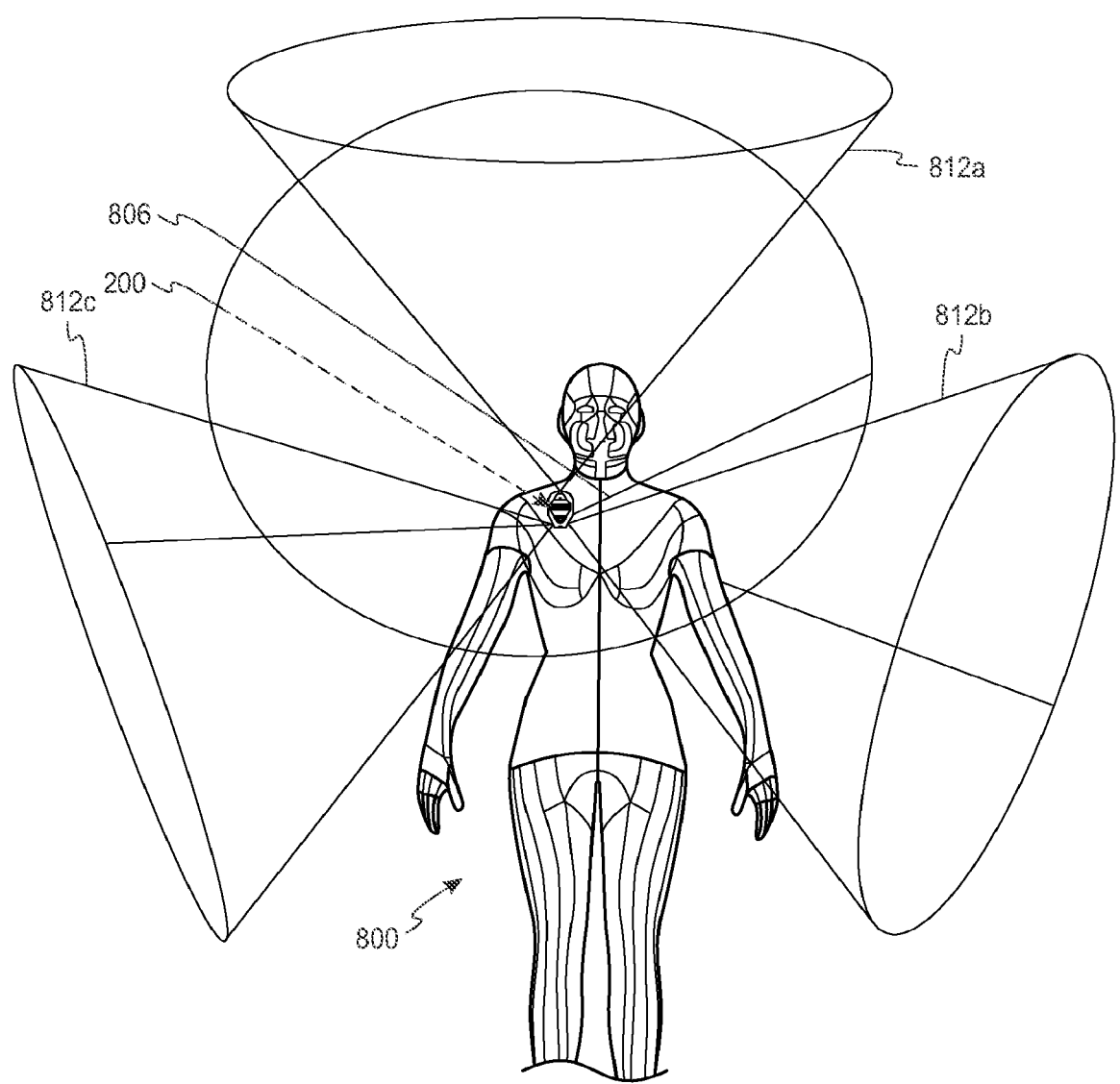
FIG. 8B is a front elevation view of the user of FIG. 8A.

Referring to FIGS. 8A and 8B, the wearable personal security device 200 is affixed to a chest 806 of an individual 800. In this configuration, the wearable personal security device 200 captures data (i.e., still images, video images, or both) from an aggregate field of view that includes the respective field of view 800a of the first digital camera 212a, the respective field of view 800b of the second digital camera 212b, the respective field of view 800c of the third digital camera 212c, and the respective field of view 800d of the fourth digital camera 212d. As best shown in FIG. 8B, respective fields of view 812b and 812c capture data from the sides of the individual 800. As best shown in FIG. 7A, respective field of view 812a captures data from the above the individual 700, while the respective field of view 812d captures data from in front of the individual 800. Because the angle θa of central axis 500a (FIG. 4B) of the first digital camera 212a has a value of approximately 45 degrees relative to the x-axis (and also the y-axis), the respective field of view 812a of the first digital camera 212a captures data without being substantially (or even completely) obstructed by a portion of the individual when the device is affixed to the chest 806. While the respective field of view 812a is shown as being partially limited by the individual's head, if the angle θa was about 0 degrees relative to the x-axis, the individual's head could completely obscure the respective field of view of the first digital camera 212a. Advantageously, in the orientation shown, the respective field of view 812a is only partially obscured or limited by the individual's head while permitting the wearable personal security device 200 to, for example, continuously monitor the individual's identity using the first digital camera 212a (i.e., verify that an authorized individual is wearing the device).

As illustrated by FIGS. 6A-8B, the orientation of the respective fields of view of the plurality of digital cameras relative to one another permit the individual to affix the wearable personal security device 200 to multiple locations on the individual's body without a portion the individual's body (e.g., arm, head, etc.) substantially obscuring or limiting one of the respective fields of view. In this manner, the relative orientation of the central axes (FIGS. 5A-5B) can be selected to achieve a desired aggregate field of view. While exemplary angles of the cameras with respect to the axes of wearable personal security device 200 and with respect to each other have been provided, other angles are also contemplated and fall with the concepts of the present disclosure.

Figure 9:
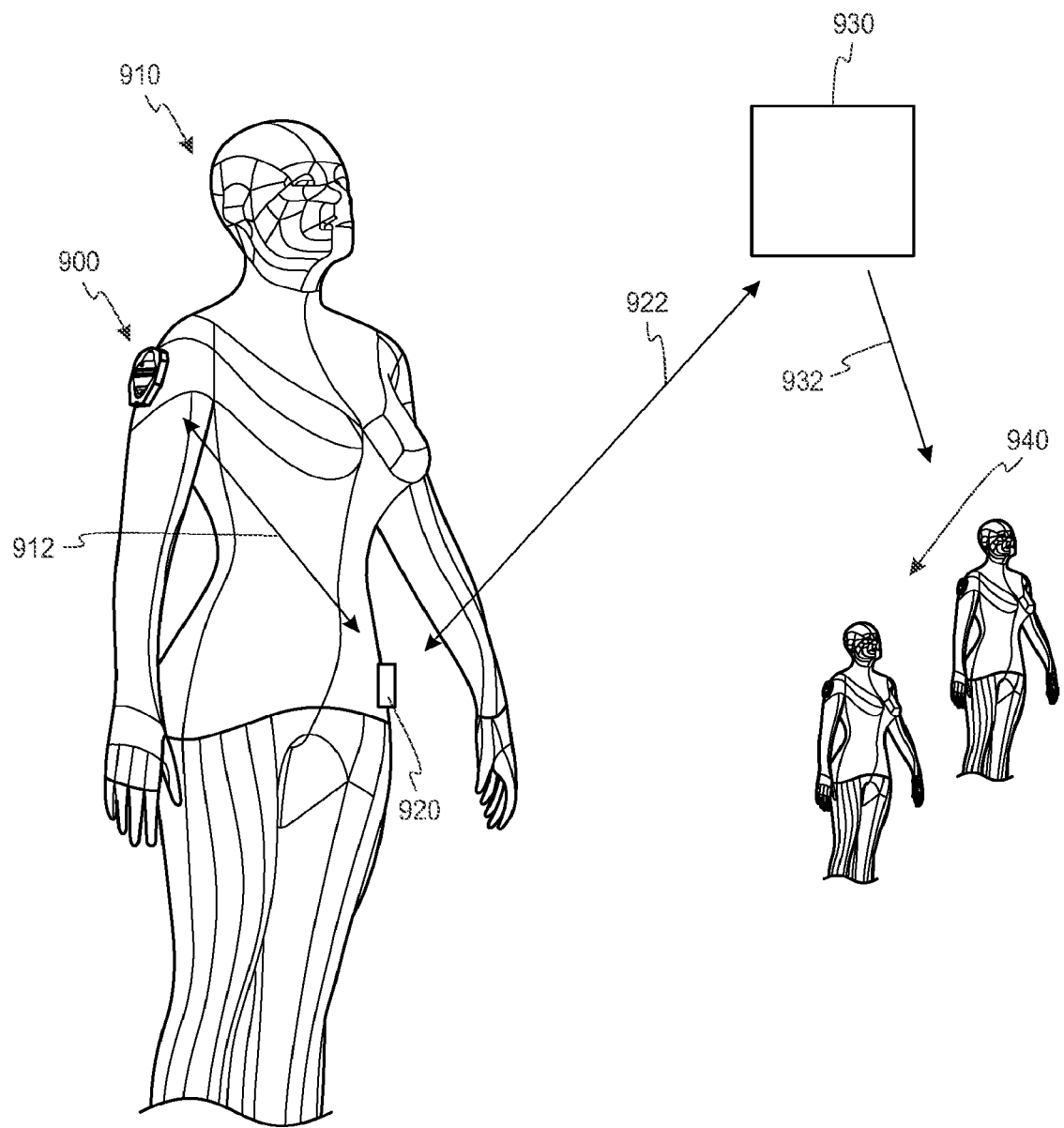
FIG. 9 is a perspective schematic illustration of the wearable personal security device of FIG. 2 affixed to a user and being communicatively coupled to an external network via a mobile device.

Referring to FIG. 9, a wearable personal security device 900 that is the same as or similar to the wearable personal security devices 100, 200 is communicatively coupled (as represented by reference numeral 912) to a mobile device 920 via a communication module (disposed within the wearable personal security device 900, and thus not shown) that is the same as or similar to the communication module 112 described above. As described above, the wearable personal security device 900 and the mobile device 920 can be communicatively coupled via, for example, a Bluetooth connection, a Wi-Fi connection, a wired connection, or the like, or any combination thereof. Generally, the connection speed between the communication module of the wearable personal security device 900 and the mobile device 920 can be, for example, between about 0.5 and 100 Mb, between about 1 and 5 Mb, about 2 Mb, etc. In turn, the mobile device 920 is communicatively coupled (as represented by reference numeral 922) to an external network 930. The external network 930 can be a cellular network, a Wi-Fi network, a near-field communication network, or any other wireless network, or the like, or any combination thereof. Generally, the connection speed between the mobile device 920 and the external network 930 can be, for example, between about 0.5 Mb and about 100 Mb, between about 1 Mb and about 5 Mb, between about 3 Mb and about 4 Mb, etc.

The mobile device 920 generally includes a memory and a processor, with an associated software application stored in the memory. The associated application can establish a communication session with the communication module of the wearable personal security device 900 (as shown by 912) and can also and process the transmitted security data using the processor of the mobile device 900, store transmitted security data in the memory of the mobile device; 900, terminate the communication session, and/or upload the transmitted security data to the external network 930. Further, a user of the mobile device can activate a manually activated security alert (described above) via the associated application.

In response to the occurrence of the one or more triggering events described above (e.g., an automatically activated security alerts, a manually activated security alert, etc.), stored, captured data and/or stored, captured sounds (collectively, "security data") from the wearable personal security device 900 is transmitted to the mobile device 920. The mobile device 920 then transmits the security data via the external network 930 to one or more third parties 940. Specifically, the one or more third parties 940 can receive the security data on their mobile device that includes the same associated application described above, or alternatively, the one or more third parties 940 can receive a text message or e-mail notification. The one or more third parties can be, for example, friends or family members of the user of the wearable personal security device 900, the user's employer, or law enforcement personnel. Alternatively, the one or more third parties can be a monitoring company that review the transmitted security data and provides access to an applicable portion thereof to an authorized person (e.g., the user's friends and family, law enforcement, etc.) as determined by services selected the user. Additionally, the monitoring company can utilize other software or applications on the user's mobile device 920 or a GPS unit included in the wearable personal security device 900 (that is the same or similar to the GPS described above) to contact a different user located nearby the wearer or disseminate the location of a triggered security alert to other users of similar security devices or systems that have a mobile device containing software or applications capable of receiving such notification.

In some implementations, the associated application includes a navigational map. Using the GPS unit of the wearable personal security device 900, the associated application receives a GPS location of the user of the wearable personal security device 900 from a communication module (that is the same as or similar to communication module 112), and the associated application displays the user's GPS location on the navigational map (which the user can view and interact with via a display of the mobile device 920). The associated application also displays one or more points of interests on the navigational map that are within a predefined range of the user's GPS location (e.g., within a block, a half-mile, two miles, etc.). The one or more points of interests can be stored in the memory of the mobile device 920 and/or received from the external network 930 (i.e., a remote server). For example, the one or more points of interest can be fixed points of interest, such as areas with historically high crime rate, areas with historically low crime rates, police stations, other areas of safety, or the like. In addition, the user of the wearable personal security device 900 and associated application can create temporary points of interest on the navigational map and submit them to the remote server such that they can be received on other users' associated application and displayed on their navigational maps. In this manner, the user and/or third parties can submit real-time, temporary points of interest such as a location with suspicious activity, a location of a known perpetrator/criminal, a location of a recently committed or attempted crime, or the like. The wearable personal security device 900 and associated application can also automatically submit a temporary point of interest (i.e., the GPS location of the user) responsive to a manually or automatically activated security alert. To encourage users to submit points of interest and ensure that the navigational map has as much relevant data as possible, users who submit a point of interest may be rewarded with a free third party monitoring service for a limited period of time. In this manner, by viewing the one or more points of interest on the navigational map, the user of the wearable personal security device 900 and associated application can further decrease the likelihood of being the victim of a crime by (i) avoiding locations or routes that currently have, or are likely to have, a security threat and/or (ii) favoring locations or routes that are near areas of safety. Similarly, responsive to a manually or automatically activated security alert, the navigational map can highlight and/or provide directions to one or more points of interest which the user can travel towards to reduce the response time for law enforcement (i.e., the location of the nearest police station).

Alternatively, rather than being communicatively coupled to the external network 930 by using the mobile device 920 as an intermediary, the wearable personal security device 900 can be directly communicatively coupled to the external network 930. In such implementations, specific communication instructions and a unique device registration identifier may be added to the device 900. Advantageously, in this configuration, the wearable personal security device 900 can transmit captured data and/or sounds without depending on the mobile device 920, which could, for example, run out of battery, be lost or stolen, etc. Further, the wearable personal security device 900 could be used by individuals who do not own a mobile device (e.g., small children, the elderly, etc.).

Figure 10:
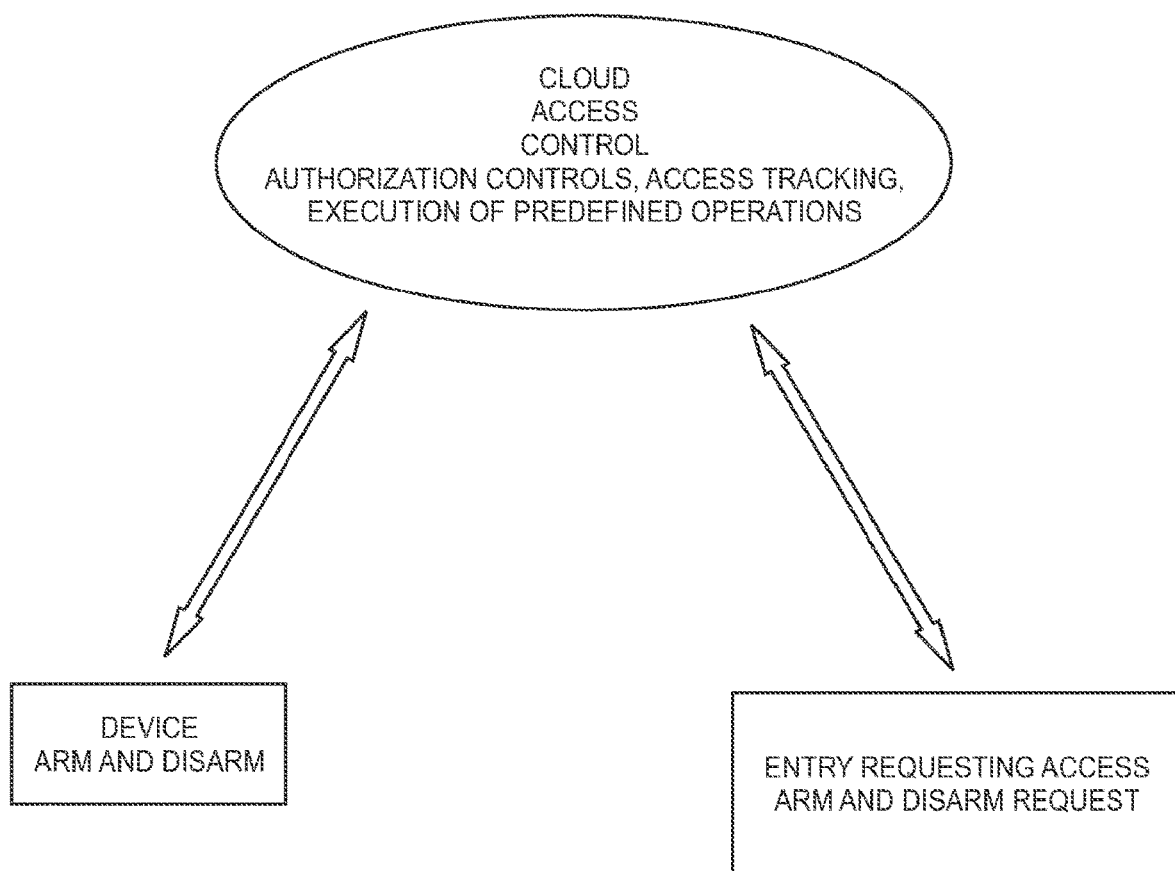
FIG. 10 is a schematic illustration of an access control system/scheme used in the operation of a security system according to implementations of the present disclosure.

Referring generally to FIG. 10, according to some implementations of the present disclosure, in certain circumstances a device of the present disclosure (e.g., security device 100 or wearable personal security device 200) utilizes an access control system, such as, for example, when communicating thru a cellular network, a wide area network, or any other type of network. Such an access control system could be open to all users, or the access control system could be controlled by an employer, association, or other controlling body. For example, a device of the present disclosure setup to monitor a certain location (e.g., a home, an office, etc.) could look to the access control system (e.g., a cloud based information depository) using network connectivity to identify authorized individuals. An authorized list of users could be created and/or stored, or a real time notification of someone requesting access could be sent to the owner and/or operator (e.g., administrator) of the device. Authorized users could either enter a code in their personal mobile device or provide some other method of identification and disarming credentials, or the owner and/or operator of the device could remotely disarm the device for individuals requesting access. The access control system could either require an individual granted access to rearm the device, the owner could remotely arm the device, or the access control system could rearm the device based upon predetermined parameters.

Further, in some implementations, a device of the present disclosure (e.g., security device 100 or wearable personal security device 200) can be configured through its executing application to permit direct access to the captured, stored data and/or sounds or real-time data and/or sounds by a third party. For example, an employer can directly access the captured, stored data on the device worn by an employee to monitor the employee's activities (i.e., whether the employee is performed specified tasks, etc.) via a direct access feature. Similarly, a friend or family member can monitor an at-risk user of the device (e.g., a child, an elderly person, a disabled person, etc.) in real-time using the direct access feature. This would allow the friend or family member to see what the user is seeing and permit the friend or family member to determine whether there is a problem (e.g., if the captured images have not moved in a long period of time, this may indicate that the user of the device is not moving and may have fallen). Advantageously, permitting direct third party access to the captured data and/or sounds via the direct access feature avoids having the third party view the user directly as would be the case using other devices (e.g., wall-mounted cameras, nanny cameras, or the like), thereby permitting the third party to be less intrusive and protecting the privacy of the user.

To maintain privacy, the direct access feature and/or security devices of the present disclosure (e.g., security device 100 or wearable personal security device 200) can be configured such that the third party can only access the captured, stored data in response to one or more of the triggering events described above. For instance, in the case of an employer monitoring an employee wearing the device, the employer may only be able to access the captured data if the employee is injured (which could be indicated by an accelerometer, as described above).

While the wearable personal security devices 100, 200 have been described herein as being designed to be worn on a user's clothing and/or accessories, a user may place the security device 100, 200 in a central location in his or her home and set the device to standby or stationary mode. After a predefined time period elapses (e.g., 30 seconds) to allow the user to exit the area without triggering an alarm, the device begins to monitor sound in the area using the microphone to detect changes in the sound levels in excess of an acceptable range. The device may also additionally utilize some or all of the plurality of digital cameras in standby/stationary mode to detect motion in the area by comparing images captured by such cameras in excess of acceptable levels of change. This comparative analysis could be processed on the processor of the security device 100, 200 or through the associated application on a mobile device. These changes in sound or images would trigger a security alert, which would have the same effects as described above. Some implementations of the present disclosure may provide different effects upon this type of security alert, such as increasing ambient light level via light-emitting diodes to improve the quality of images and/or not emitting sounds or light.

Further, while the wearable personal security devices 100, 200, 900 have been described as personal security-related, each of these devices can be used to obtain information acquired during the use of the device. For example, in such implementations where a wearable personal security device includes a GPS unit, the device can be used to determine the number of steps taken by the user, the distance that the user traveled, etc. Further, the wearable personal security devices 100, 200, 900 can continuously store captured data (e.g., still images, video clips, audio/sound clips, etc.) and by using the GPS unit, digitally map rooms and other interior spaces, or any other environment. This data can then be used to create digital representations of various environments (e.g., a specific room, a house, a street, etc.).

While the disclosure is susceptible to various modifications and alternative forms, specific embodiments and methods thereof have been shown by way of example in the drawings and are described in detail herein. It should be understood, however, that it is not intended to limit the disclosure to the particular forms or methods disclosed, but, to the contrary, the intention is to cover all modifications, equivalents and alternatives falling within the spirit and scope of the disclosure. For example, while the above discussion is focused on the use of the present disclosure by an individual during common activities conducted outside of the individual's residence, including, without limitation, commuting to work, running errands and exercising, the present disclosure may be used in multiple applications, including commercial applications addressing worker safety, productivity, and facility management, and any commercial applications may provide for access to the captured sounds and images, before or after an alert, to the entity employing, engaging, or otherwise contracting with the user of the security system.

What is claimed is:

1. A wearable security device comprising:
a housing;
one or more cameras coupled to the housing;
a communication module configured to be communicatively coupled to an external device;
an electronic storage medium storing machine-readable instructions; and
one or more processors configured to execute the machine-readable instructions to:
identify a first automatic triggering event; and
in response to the identification of the first automatic triggering event, (i) cause the one or more cameras to generate image data, (ii) cause at least a portion of the generated image data to be stored in the electronic storage medium in an encrypted format, and (iii) cause the at least a portion of the stored imaged data to be transmitted to the external device, wherein the at least a portion of the stored image data is only accessible to a user of the wearable security device subsequent to the at least a portion of the stored imaged data being transmitted to the external device.

2. The wearable security device of claim 1, wherein the first automatic triggering event is identified based at least in part on a location of the wearable security device.

3. The wearable security device of claim 2, further comprising a GPS sensor configured to determine the location of the wearable security device.

4. The wearable security device of claim 1, wherein the first automatic triggering event is identified based at least in part on information received from the external device.

5. The wearable security device of claim 1, wherein the at least a portion of the stored image data includes still images, video images, or both.

6. The wearable security device of claim 1, wherein the one or more processors are further configured to identify a second automatic triggering event that is subsequent to the first automatic triggering event, and in response to the identification of the second automatic triggering event, cause the one or more cameras to modify the generation of the image data.

7. The wearable security device of claim 6, wherein the second automatic triggering event is based at least in part on a location of the wearable security device.

8. The wearable security device of claim 6, wherein prior to the second automatic triggering event, the generated image data includes still images, and subsequent to the second automatic triggering event, the generated image data includes video images.

9. The wearable security device of claim 1, wherein the communication module is configured receive information from an access control system and the first automatic triggering event is identified based at least in part on the information from the access control system.

10. The wearable security device of claim 1, further comprising a microphone, a speaker, one or more light emitting diodes (LEDs), a light sensor, an accelerometer, a gyroscope, or any combination thereof.

11. The wearable security device of claim 1, wherein the housing includes a clip configured to be coupled to clothing of a user of the wearable security device.

12. The wearable security device of claim 1, wherein the one or more cameras includes a first camera and a second camera, the first camera and the second camera each having a respective field of view, the respective fields of view being orientated relative to one another such that respective fields of view permit the first camera and the second camera to capture data from in front of and behind a user of the wearable security device.

13. A method comprising:
receiving information associated with a user of a wearable security device;
authorizing, via an access control system, the user of the wearable security device based at least in part on the information associated with the user;
generating, via one or more cameras of the wearable security device, image data in response to an automatic triggering event;
storing the generated image data in an electronic storage medium in an encrypted fashion to aid in preventing the user of the wearable security device from accessing the generated image data; and
transmitting at least a portion of the generated image data to a remote server.

14. The method of claim 13, wherein the received information associated with the user of the wearable security device includes user credentials.

15. The method of claim 14, further comprising transmitting at least portion of the image data transmitted to the remote server from the remote server to an authorized third party.

16. The method of claim 13, wherein the transmitting the generated image data to the remote server includes transmitting the image data from the wearable security device to a mobile device, and transmitting at least a portion of the image data from the mobile device to the remote server.

17. The method of claim 13, further comprising determining a location of the user of the wearable security device based at least in part on data from a GPS sensor.

18. The method of claim 17, wherein the GPS sensor is coupled to or integrated in the mobile device.

19. The method of claim 18, further comprising transmitting information indicative of the location of the user of the wearable security device to the remote server.

20. The method of claim 18, wherein the automatic triggering event is based at least in part on the determined location of the wearable security device.

21. The method of claim 13, wherein the wearable security device is communicatively coupled to the mobile device via a Bluetooth connection and the mobile device is communicatively coupled to the remote server via a cellular network or a Wi-Fi network.

* * * * *